US010643195B2

(12) United States Patent
Berry et al.

(10) Patent No.: US 10,643,195 B2
(45) Date of Patent: May 5, 2020

(54) SELF-CONFIGURING NETWORKED MEDIA HUB DEVICES WITH AUTOMATED CONFIGURATION AND FAILOVER RECOVERY OF PEERS

(71) Applicant: CATALINA MARKETING CORPORATION, St. Petersburg, FL (US)

(72) Inventors: Angus Berry, St. Petersburg, FL (US); James B. Clack, St. Petersburg, FL (US)

(73) Assignee: CATALINA MARKETING CORPORATION, St. Petersburg, FL (US)

( * ) Notice: Subject to any disclaimer, the term of this patent is extended or adjusted under 35 U.S.C. 154(b) by 226 days.

(21) Appl. No.: 15/233,177

(22) Filed: Aug. 10, 2016

(65) Prior Publication Data

US 2017/0048106 A1 Feb. 16, 2017

Related U.S. Application Data

(60) Provisional application No. 62/203,700, filed on Aug. 11, 2015.

(51) Int. Cl.
*G06F 15/16* (2006.01)
*G06Q 20/20* (2012.01)
(Continued)

(52) U.S. Cl.
CPC ......... *G06Q 20/20* (2013.01); *G06Q 20/0453* (2013.01); *H04L 12/12* (2013.01);
(Continued)

(58) Field of Classification Search
CPC ............... G06Q 20/0453; G06Q 20/20; H04L 41/0654; H04L 41/0813; H04L 41/0866; H04L 67/06; H04L 67/22; H04W 4/80
See application file for complete search history.

(56) References Cited

U.S. PATENT DOCUMENTS 6,718,160 B2   4/2004 Schmutz ..................... 455/11.1
7,263,070 B1   8/2007 Delker et al.
(Continued)

FOREIGN PATENT DOCUMENTS

CA    2 700 429 C    12/2013
EP    2 220 887 B1    6/2012
(Continued)

OTHER PUBLICATIONS

International Search Report and Written Opinion dated Dec. 28, 2016, which issued in International Application No. PCT/US16/46274.
(Continued)

*Primary Examiner* — Ario Etienne
*Assistant Examiner* — Thorne E Waugh
(74) *Attorney, Agent, or Firm* — McDermott, Will & Emery LLP

(57) ABSTRACT

Various systems and methods of self-configuring networked media hub devices with failover recovery of peers are disclosed. For example, a media hub device may be configured in an "out-of-the-box" solution in which the media hub, upon startup, obtains configuration data from a remote device. Peer media hub devices may be connected to one another via a local network and may each be self-configured in the same manner. Each media hub device may monitor other media hub devices on the local network. Based on such monitoring, each media hub device may detect that one of the media hub devices is offline and a new media hub device is online. One or more of the online media hub devices may automatically configure the new media hub device using the offline media hub device's configuration data, thereby configuring the new media hub device to replace the offline media hub device.

21 Claims, 14 Drawing Sheets

(51) Int. Cl.
*H04L 29/08* (2006.01)
*G06Q 20/04* (2012.01)
*H04W 4/80* (2018.01)
*H04L 12/26* (2006.01)
*H04L 12/24* (2006.01)
*H04L 12/12* (2006.01)

(52) U.S. Cl.
CPC ...... *H04L 41/0654* (2013.01); *H04L 41/0813* (2013.01); *H04L 41/0866* (2013.01); *H04L 41/0886* (2013.01); *H04L 43/065* (2013.01); *H04L 67/06* (2013.01); *H04L 67/22* (2013.01); *H04W 4/80* (2018.02)

(56) References Cited

U.S. PATENT DOCUMENTS

| | | | |
|---|---|---|---|
| 7,386,105 B2* | 6/2008 | Wasserblat | G10L 17/26 379/114.14 |
| 7,415,426 B2 | 8/2008 | Williams et al. | 705/14 |
| 7,487,912 B2* | 2/2009 | Seifert | G06Q 20/0453 235/380 |
| 7,603,124 B2 | 10/2009 | Claussen et al. | 455/437 |
| 7,826,847 B1 | 11/2010 | Roskowski et al. | |
| 7,924,727 B2 | 4/2011 | MacDonald | 370/238 |
| 8,102,854 B2 | 1/2012 | Singh et al. | 370/392 |
| 8,264,986 B2 | 9/2012 | Nagano et al. | 370/255 |
| 8,355,726 B2 | 1/2013 | Claussen et al. | 455/444 |
| 8,473,342 B1 | 6/2013 | Roberts | 705/14.35 |
| 8,489,456 B2 | 7/2013 | Burgess et al. | 705/14.47 |
| 8,744,907 B2 | 6/2014 | Roberts | 705/14.26 |
| 8,774,056 B2 | 7/2014 | Lueckenhoff et al. | 370/255 |
| 8,831,642 B2 | 9/2014 | Moldavsky et al. | 455/456.3 |
| 2006/0203746 A1 | 9/2006 | Maggenti et al. | 370/254 |
| 2007/0147412 A1 | 6/2007 | Wei | |
| 2009/0219823 A1 | 9/2009 | Zhiqiang | |
| 2009/0262662 A1* | 10/2009 | Ramachandran | H04W 24/04 370/254 |
| 2011/0047023 A1 | 2/2011 | Lieblang et al. | 705/14.36 |
| 2011/0053692 A1 | 3/2011 | Farr-Jones et al. | 463/40 |
| 2011/0119132 A1 | 5/2011 | Morton et al. | 705/14.53 |
| 2011/0264772 A1 | 10/2011 | Krapf et al. | |
| 2011/0271098 A1 | 11/2011 | Bishop | |
| 2012/0010931 A1 | 1/2012 | Mehra et al. | 705/14.16 |
| 2012/0022930 A1 | 1/2012 | Brouhard | |
| 2012/0022944 A1 | 1/2012 | Volpi | |
| 2012/0166279 A1 | 6/2012 | Collins | 705/14.53 |
| 2012/0226791 A1* | 9/2012 | Ramaswamy | H04L 41/12 709/223 |
| 2012/0259612 A1 | 10/2012 | Lyons et al. | |
| 2012/0278140 A1 | 11/2012 | Mercuri et al. | 705/14.1 |
| 2013/0103500 A1 | 4/2013 | Veeneman et al. | 705/14.57 |
| 2013/0110654 A1 | 5/2013 | Korbres | |
| 2013/0124333 A1 | 5/2013 | Doughty et al. | 705/14.66 |
| 2014/0025515 A1* | 1/2014 | Argue | G06Q 20/0453 705/21 |
| 2014/0180802 A1 | 6/2014 | Boal | |
| 2014/0180808 A1 | 6/2014 | Boal | |
| 2014/0180809 A1 | 6/2014 | Boal | |
| 2014/0180810 A1 | 6/2014 | Boal | |
| 2014/0180811 A1 | 6/2014 | Boal | |
| 2014/0214501 A1 | 7/2014 | Schilling | 705/14.2 |
| 2015/0005011 A1 | 1/2015 | Nehrenz et al. | 455/456.3 |
| 2015/0016305 A1 | 1/2015 | Elie | |
| 2015/0112790 A1 | 4/2015 | Wolinsky | |
| 2015/0195099 A1* | 7/2015 | Imes | G05B 15/02 700/275 |
| 2015/0227933 A1 | 8/2015 | Serebrennikov | |
| 2017/0046676 A1 | 2/2017 | Berry et al. | |

FOREIGN PATENT DOCUMENTS

| | | |
|---|---|---|
| WO | WO 01/48946 | 7/2001 |
| WO | WO 02/095535 | 11/2002 |
| WO | WO 2013/070687 | 5/2013 |

OTHER PUBLICATIONS

European Supplementary Search Report for EP App. No. 16 83 5811, dated Jan. 28, 2019, 7 pages.

* cited by examiner

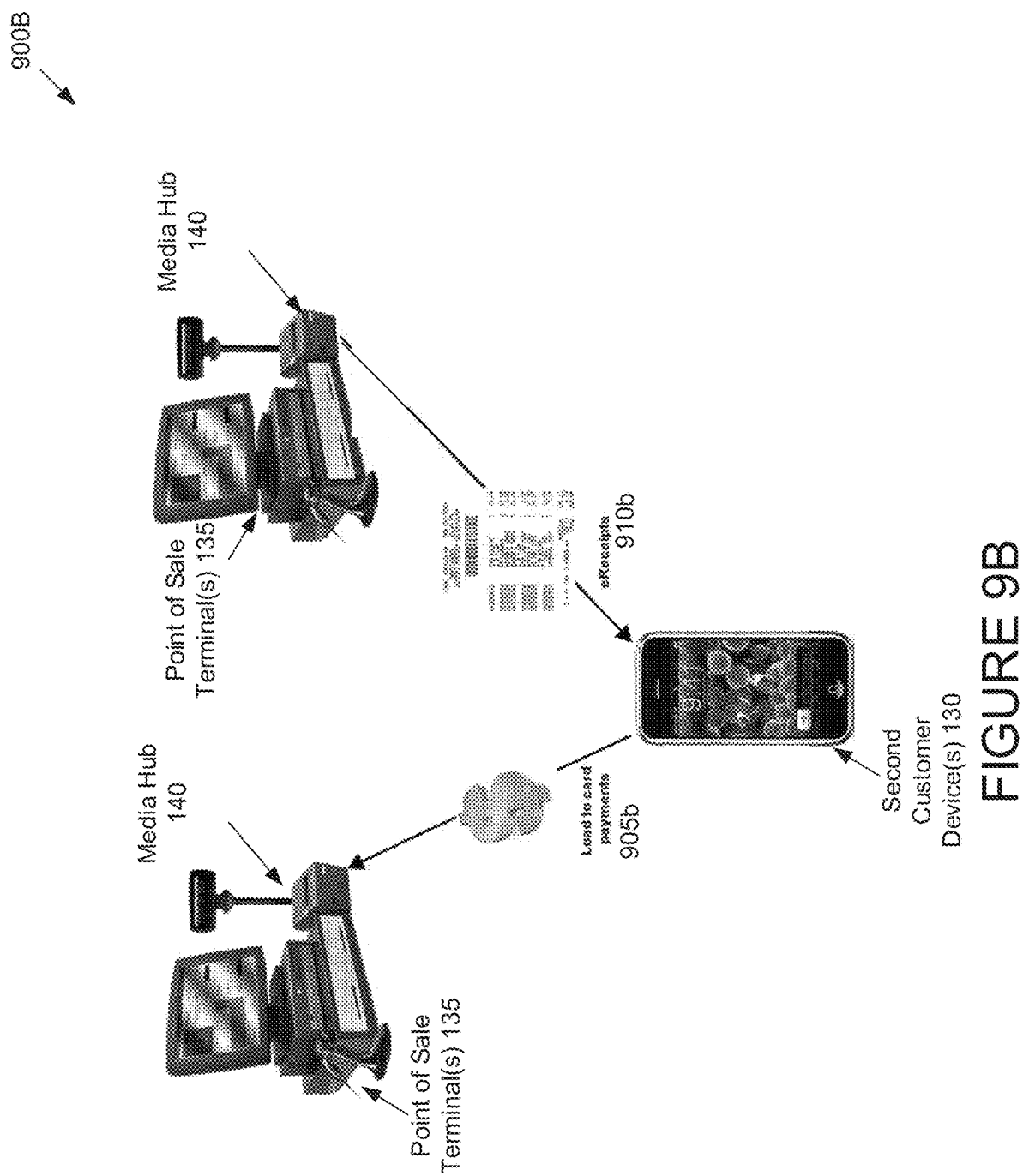

SELF-CONFIGURING NETWORKED MEDIA HUB DEVICES WITH AUTOMATED CONFIGURATION AND FAILOVER RECOVERY OF PEERS

CROSS-REFERENCE TO RELATED APPLICATIONS

This application claims priority to U.S. Provisional Patent Application Ser. No. 62/203,700, filed Aug. 11, 2015, which is hereby incorporated by reference herein in its entirety. This application is also related to the following, co-pending U.S. patent application Ser. No. 15/233,300, filed Aug. 10, 2016, entitled "Media Hub Devices With Passive Monitoring of User Devices and Targeted Media Transmission Through In-Channel Transmission or Shifted Channel Transmission," which is also hereby incorporated by reference herein in its entirety.

FIELD OF THE INVENTION

The invention relates to self-configuring networked media hub devices, each of which initially configures itself "out-of-the-box" based on configuration data received from a remote device and, in operation, configures new peer media hub devices detected on a local network of media hub devices.

BACKGROUND OF THE INVENTION

Devices that provide specific content, such as media, conventionally require manual configuration by an expert administrator. As such, initial setup and configuration for these devices becomes time consuming and prone to error. Furthermore, in a network of such devices, one or more devices may fail and be difficult to replace, resulting in downtime. These and other problems exist with networked devices that require configuration in order to become operational and provide media.

SUMMARY OF THE INVENTION

The invention addressing these and other drawbacks relates to a system and method of self-configuring networked media hub devices with failover recovery of peers. For example, a media hub device may be configured in an "out-of-the-box" solution in which the media hub device, upon startup, obtains configuration data from a remote device, such as via an administrator device connected to the media hub via short-range wireless connection or an offer management system connected to the media hub via a wide area network. Peer media hub devices may be connected to one another via a local network and may each be self-configured in the same manner. Each media hub device may monitor other media hub devices on the local network. Based on such monitoring, each media hub device may detect that one of the media hub devices is offline and a new media hub device is online. One or more of the online media hub devices may automatically configure the new media hub device by transmitting configuration data to the newly discovered online media hub device. In some instances, the offline media hub device's configuration data may be transmitted to the new media hub device, thereby configuring the new media hub device to replace the offline media hub device.

According to an implementation of the invention, a device, referred to herein as a "media hub" or "media hub device" may be deployed at a location of a retail store or other facility ("deployment location" or "deployed location"). For example, a media hub may be deployed in each check-out lane (or other checkout area or station) of a retail store, and may be configured to perform various functions associated with other in-store devices (e.g., other media hubs in nearby check-out lanes, or other system components), as well as functions associated with a customer's activities in a retail store, as described in greater detail herein.

According to an implementation of the invention, a given media hub may be "self-configuring" in that it requires minimal to no manual configuration by a user to become operational (i.e., perform the various functions described herein), may be automatically configured by an already operational peer media hub with minimal to no manual configuration by a user, and/or may automatically update its configuration data without user intervention.

According to an implementation of the invention, one or more media hubs may each configure itself during an initial setup of a retail store or other location. For example, a retailer (e.g., an administrator of the retailer) associated with a retail store may register to use the system. During such registration (or thereafter), the retailer may select various media, including general media and retailer-specific media, to provide through its media hubs. The retailer may also provide various rules, configuration data, threshold values, and/or other information described herein relating to its media hubs. The system may store the foregoing information so that media hubs associated with the retailer may be configured automatically based on the information provided by the retailer. For example, a media hub of a retailer may obtain a network address of an offer management system and, when connected to a network (e.g., a WiFi network of a retail store), communicate with the offer management system via the network using the network address. The network address may be obtained from a pre-stored memory of the media hub or may be obtained from an administrator device that is used to perform an initial setup of the retail store. The offer management system may provide (and the media hub may receive), configuration data used to configure the media hub. Such configuration data may include configuration data that was previously provided by the retailer (e.g., during registration of the retailer to use the system or thereafter). The media hub may configure itself using the configuration data to become operational.

According to an implementation of the invention, when an initial setup of a retail store or other location has been completed, and a group of media hubs have been initially configured, during operation, each media hub may monitor a status of other media hubs in the group. If a media hub detects or otherwise discovers a new media hub (e.g., one that was not previously known), then the media hub may provide configuration data for the newly detected media hub. The newly detected media hub may use such configuration data to become operational.

According to an implementation of the invention, a media hub may detect that another previously known media hub in the group has no longer been detected for a threshold period of time. Either before or after the previously known media hub in the group has no longer been detected, the media hub may detect a new media hub and may assume that the new media hub should replace the previously known media hub. As such, the media hub may provide the configuration data relating to the previously known media hub to the new media hub such that the new media hub is able to replace the previously known media hub.

According to an implementation of the invention, to prevent multiple media hubs in the group from configuring the new media hub, each media hub may configure other media hubs in accordance with a peer configuration rule or trigger (e.g., a rule that assigns peer(s) to a media hub with which the media hub is responsible to configure, a first-to-detect rule in which a media hub that first detects that a replacement should occur is responsible for configuring the new media hub, an explicit indication from an administrator for one media hub to configure another media hub, etc.).

According to an implementation of the invention, multiple media hubs may automatically configure a newly detected media hub in a cooperative, centralized or decentralized peer-to-peer, fashion. In these instances, the new media hub may obtain various portions of its configuration data from multiple peer media hubs. For example, a first portion of the configuration data may be obtained from a first peer media hub and a second portion of the configuration data may be obtained from a second peer media hub. The new media hub may then generate the full configuration data based on the first and second portions. Of course, the foregoing requires that the first and second peer media hubs each have a copy (or at least portions) of the same configuration data intended for the new media hub. The first peer media hub, the second peer media hub, other peer media hubs participating in the peer-to-peer configuration operation, or the new media hub may act as a central controller that coordinates which peer media hub is to provide particular portions of the configuration data intended for the new media hub. In the peer-to-peer model, a given media hub may provide at least a portion of the configuration data (e.g., the configuration data of a media hub to be replaced) to the new media hub.

According to an implementation of the invention, upon determining that a peer media hub device is missing from the known peer media hub devices, a media hub device may transmit an alert to a remote system indicating that the second media hub device has not been detected. The remote system may include an offer management system or an administrator device.

A media hub may comprise its own motherboard with one or more dedicated processors, memory, buses, peripherals, etc. A media hub may have its own operating system that runs processes, applications, etc., and may serve as an in-lane platform that can perform the functionality set forth herein along with future functionality. The media hub may comprise one or more self-configuring wireless device(s) to reduce the need for manual set-up or configuration.

In one implementation of the invention, the media hub may comprise a stand-alone device that may be connected directly or wirelessly to an (in-store) in-lane printer or other system component.

Alternatively, the media hub may comprise a component of another device located at the POS such as, for example, a printer. In one implementation, for instance, the media hub may comprise a wireless printer that includes a printer control component and a separate controller (or other components) that enable the identified features and functions of the media hub. Other configurations may be implemented. One advantage of the wireless printer is that it avoids the need for cables to connect the printer to an in-store server. Another advantage is the ability to make the printers self-configuring as described herein. Additionally, the media hub may be updated (e.g., new functionality and or applications added) wirelessly and/or remotely.

According to an implementation of the invention, media hub(s) may be coupled to a local network (e.g., a local area network, a wireless network, a cellular data network, etc.) in a retail facility. The network may track locations of customers in the facility (e.g., by tracking the locations of the customers' devices). Various location-based services may be implemented as a result of this configuration.

In one implementation of the invention, the media hub may be controlled or otherwise be configured by an offer management system. The offer management system may be coupled to the various media hubs in a retail facility over a network connection, such as the local network in the retail facility, or a larger network, such as an extranet or the Internet. The offer management system may support various features of the media hubs, including installation and/or configuration of the media hubs. As an example, the offer management system may manage installation of media hubs when the media hubs are initially powered on or on-boarded to the local network, as previously described. As another example, the offer management system may manage configuration of one or more of the media hubs when those media hubs are powered-down or off-boarded from the local network.

Once configured, a media hub may be operable to perform various functions associated with a customer's activities in a retail store including, but not limited to, a customer checking out at a checkout lane in a retail store. The media hub may attempt to identify a customer in a checkout lane in a variety of ways (described in detail below). The media hub may, for instance, detect the presence of a digital device (e.g., a smartphone or other mobile device) associated with the customer.

The media hub may be used to identify customers or at least recognize a person as the same customer even if the actual customer's identity is not known. For example, if a customer has provided loyalty card information during a checkout, and the media hub identifies data associated with the customer device (e.g., a device identifier or other identifier), this data may be stored as part of a user profile in a database (along with, for example, transaction history information and other profile information) accessible by the media hub. On a subsequent visit, if a media hub detects the customer device, the customer may be identified (and loyalty account data retrieved) even if the customer does not have, or does not enter, their loyalty number. In this manner, targeted offers and other customer-specific services may be provided. Similarly, payment information, user-entered identification information, and other information can be linked and stored in a user profile and used in a similar way. In some instances, even if a customer does not have a loyalty card (e.g., has not signed up for a loyalty account), a media hub may store identifying information for the customer device in association with transaction information such as purchases made. In this manner, the media hub may target media such as offers to the customer based on detection of the customer's device in subsequent visits based on purchases made while the customer's device was detected during previous visits.

According to an implementation of the invention, the media hub may determine whether a customer has already downloaded a client application such as a predetermined mobile application (e.g., a loyalty application associated with the retailer or other entity, or other application). If it is determined that a customer has not already downloaded a predetermined mobile application, the media hub may incent or otherwise prompt the customer to download the application. As a non-limiting example, the media hub may be in operative communication with an in-lane printer so as to cause the in-lane printer to print a message on a POS receipt at the conclusion of a transaction. The message may include a QR code or other message to prompt the customer to perform the download. An incentive may also be provided to the customer as desired. Optionally, upon download of the mobile application, the customer may be prompted to enter customer identification information (e.g., loyalty card information, mobile number, device identifier and/or other customer identification information). A user profile may be updated upon detection that the user has downloaded the mobile application. This status indicator may be used during subsequent visits to enable the media hub to communicate directly with the known customer's mobile device as described herein. By way of example, the media hub may be used to detect the presence of the customer device and read user or device identification data (or other identifier) and compare it with previously stored information to identify the customer and/or customer-related information.

Additionally, the media hub may be used to transmit offers directly to a customer device. This action may be occur in lieu of (or in addition to) printing offers on a receipt. The media hub may be configured to make and deliver offer determinations in-lane at the time of checkout. This is a significant advantage over many systems where offers are created and managed at a remote offer management system (often under control of a third party), or by an in-store server located remote from the checkout lanes. The media hub may access and/or receive data from the POS terminal (e.g., to obtain real-time data regarding items that a customer is purchasing). The media hub may also receive information from a remote offer management system (in batch and/or real-time), and/or an in-store server. This information may be used to generate real-time, targeted offers, which can be delivered to the customer via a printed receipt, via direct communication to the customer device, or both.

Another advantage of the invention is the ability of the media hub to transmit a receipt directly to a customer device (e.g., via text message, BLE, or other messaging protocol) without using electronic mail. This is beneficial in that it avoids the ability for third-party e-mail service providers to datamine the contents of the receipt for targeted marketing, keyword advertising, or other purposes.

These and other objects, features, and characteristics of the system and/or method disclosed herein, as well as the methods of operation and functions of the related elements of structure and the combination of parts and economies of manufacture, will become more apparent upon consideration of the following description with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 9B is an exemplary depiction of a process of providing offers to a secure mobile application on a customer device proximate to a media hub, according to an implementation of the invention.

DETAILED DESCRIPTION OF THE INVENTION

The invention relates generally to wireless Point of Sale ("POS") interaction management systems and methods, including printers or other devices with wireless connectivity, to communicate with customers' mobile devices in a retail check-out lane (or other retail facility location), as well as other system components either directly or indirectly (via wired or wireless communication) as described in greater detail herein.

Exemplary System Architecture

Figure 1A:
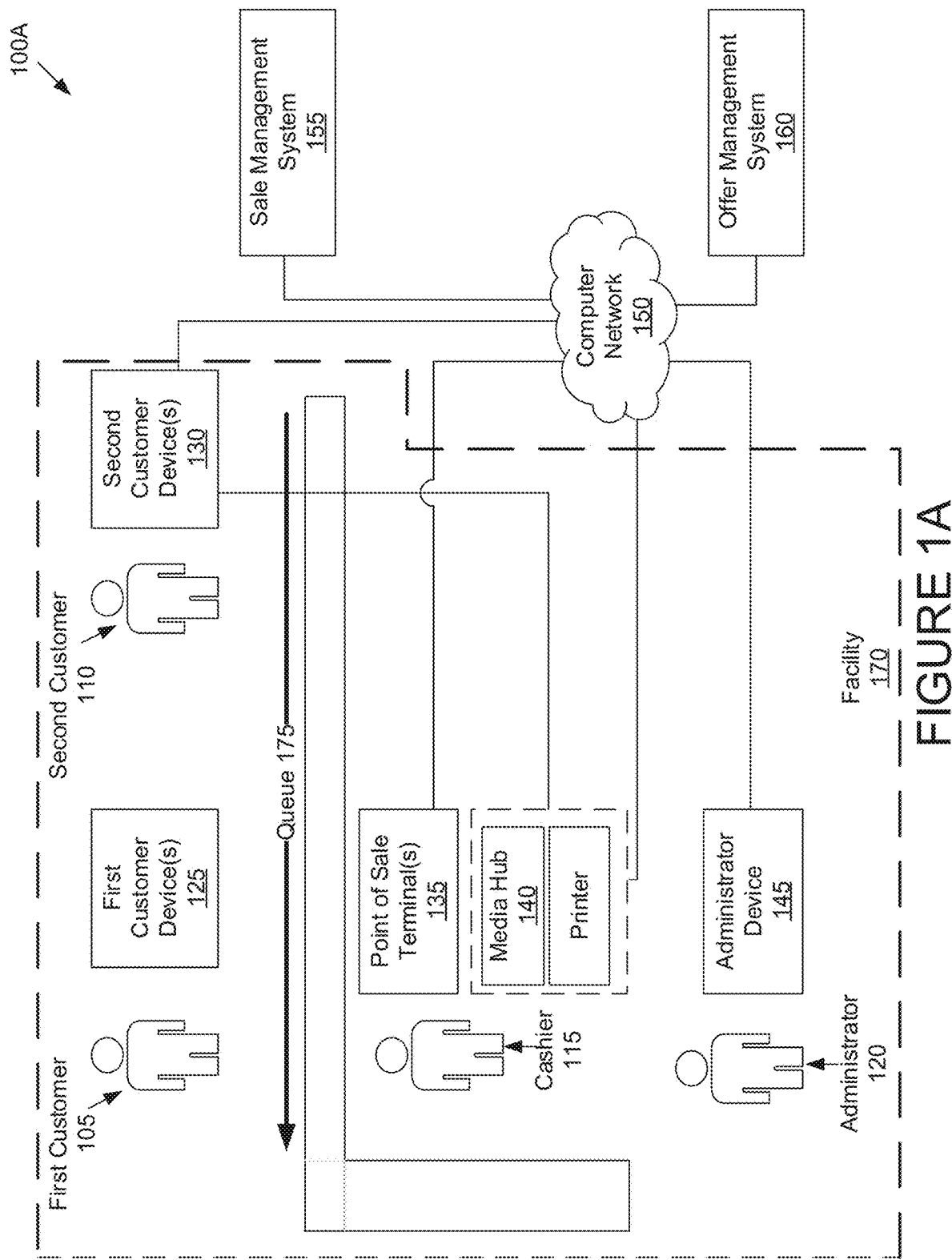
FIGS. 1A-1C are exemplary depictions of a mobile marketing environment, according to aspects of the invention.
Figure 1B:
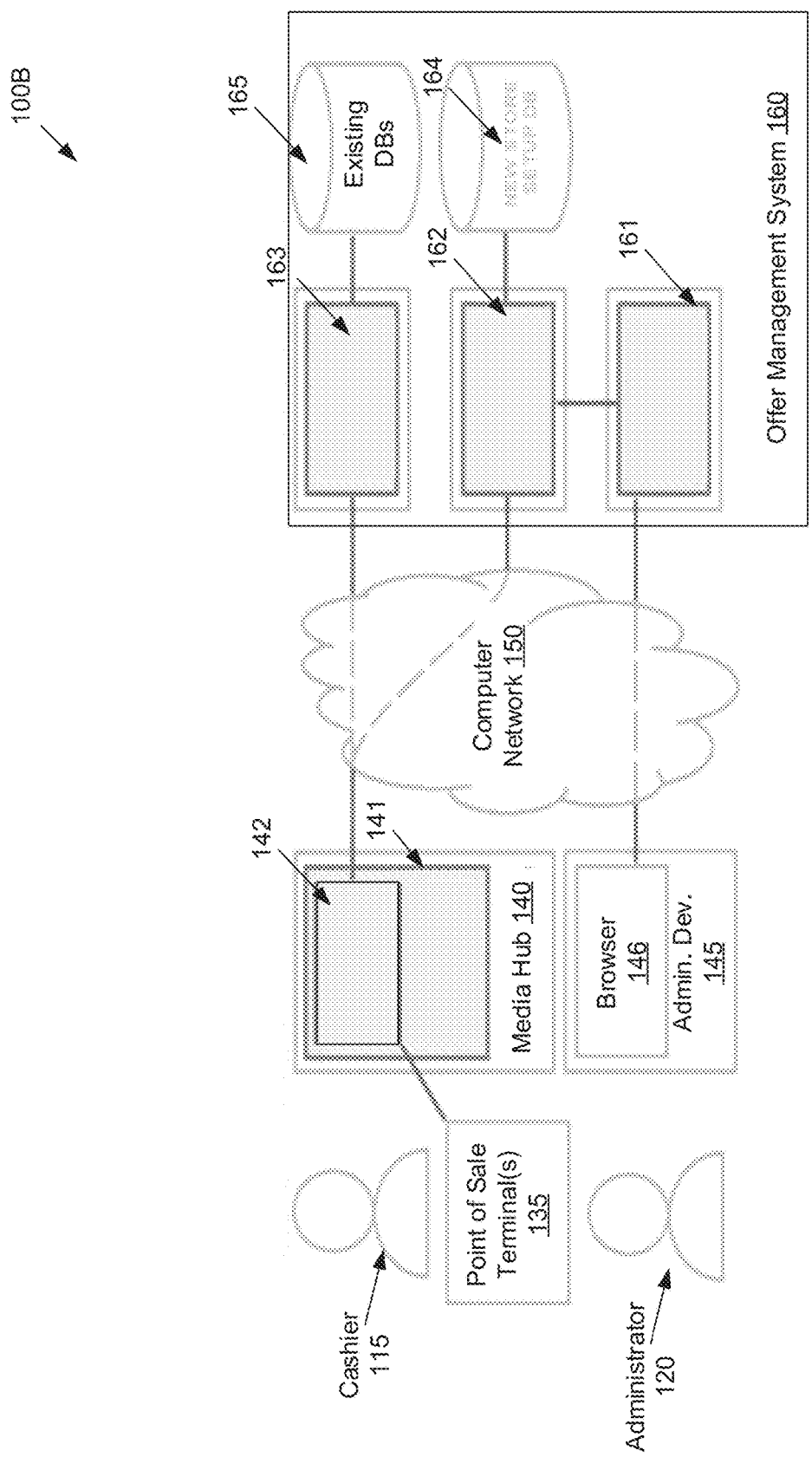
Figure 1C:
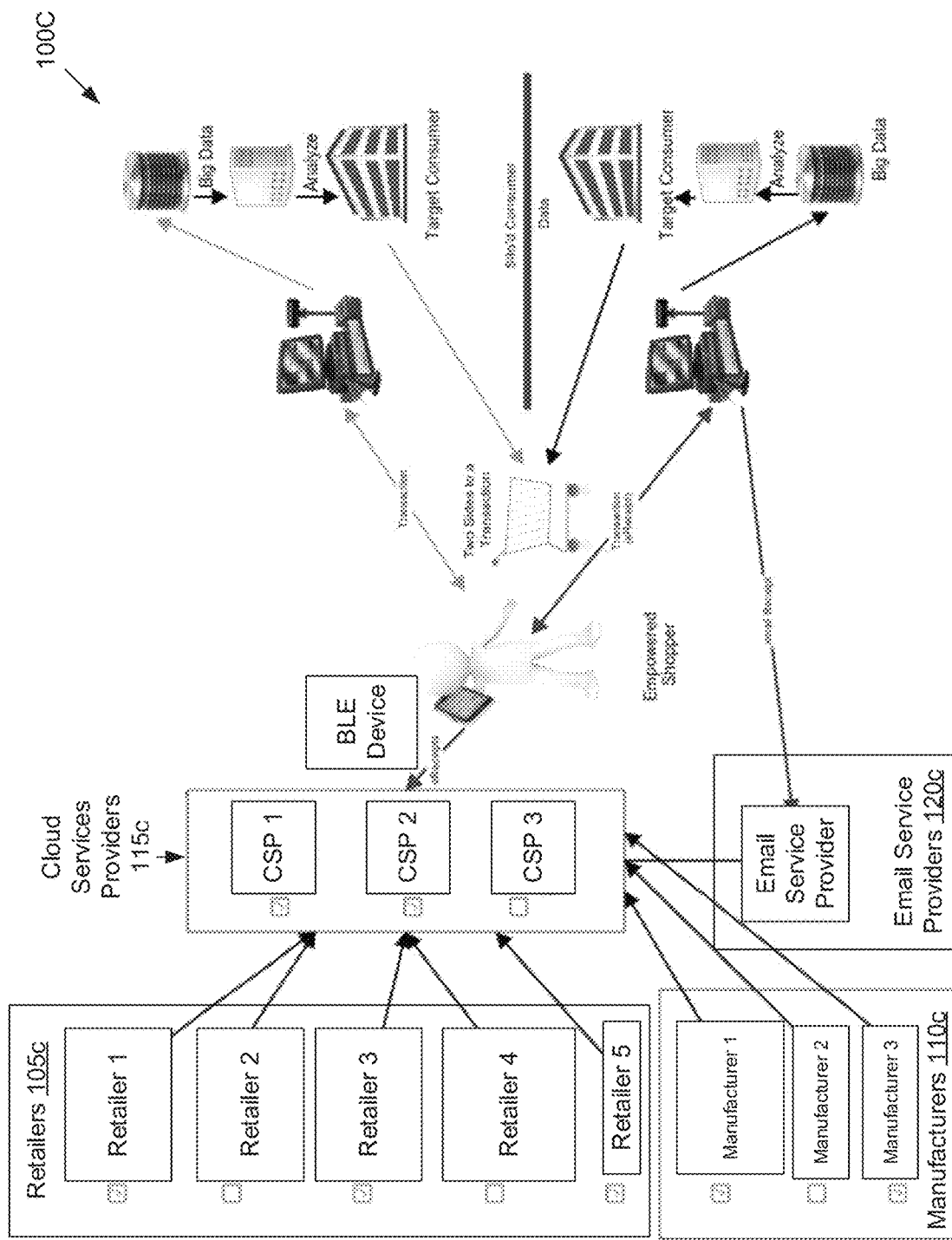

FIGS. 1A-1C are exemplary depictions of a mobile marketing environment, according to aspects of the invention. The exemplary depictions, which comprise various system components in various configurations, are exemplary only and should not be viewed as limiting in any way. Other system configurations may be used as well, as would be appreciated by those having skill in the art.

With reference to FIG. 1A, mobile marketing environment 100A may include a plurality of people, such as a first customer 105, a second customer 110, a cashier 115, and an administrator 120. Mobile marketing environment 100A may further include a plurality of devices, including first customer device(s) 125, second customer device(s) 130, a point of sale terminal(s) 135, one or more media hub(s) 140, an administrator device 145, a computer network 150, a sale management system 155, and an offer management system 160. The mobile marketing environment 100A may further include a facility 170 and a queue (or check-out lane) 175.

The facility 170 may correspond to any physical facility. In some implementations, the facility 170 corresponds to a store, such as a grocery store, a drug store, a clothing store, a supermarket, a big box retailer, a deli, etc. The facility 170 may also correspond to portions of an event center, a stadium, an airport, a railway station, etc. The facility 170 may, for example, include the first customer 105, the second customer 110, the cashier 115, the administrator 120, the first customer device(s) 125, the second customer device(s) 130, the point of sale terminal(s) 135, the media hub(s) 140, and the administrator device 145. In one non-limiting implementation, the sale management system 155 and/or the offer management system 160 may be located remotely from the facility 170. Of course, the number and location of each of the system components may vary in different implementations.

For ease of illustration, FIG. 1A depicts only a single queue (or check-out lane) 175 along with the point of sale terminal(s) 135 and the media hub(s) 140. It should be appreciated that facility 170 may comprise any number of queues (or check-out lanes) 175, each having its own point of sale terminal(s) 135, media hub(s) 140, and cashier 115. It should additionally be appreciated that the point of sale terminal(s) 135 need not be not managed by a person, but may rather comprise a terminal allowing for self-service (or automated) checkout.

The first customer 105 may include a first person in the facility 170. The first customer 105 may be located at a first location along (e.g., at a head of) the queue 175. The first customer 105 may also be at a first distance from the point of sale terminal(s) 135. More particularly, the first customer 105 may be sufficiently close to the point of sale terminal(s) 135 to pay for one or more items being sold in the facility 170. For example, the first customer 105 may be sufficiently close to the point of sale terminal(s) 135 to provide cash, credit and/or other payment cards, and/or mobile payments (e.g., within the vicinity of a Near Field Communications (NFC) chip of the point of sale terminal(s) 135) to the point of sale terminal(s) 135.

The second customer 110 may include a second person in the facility 170. The second customer 110 may be located at a second location along (e.g., a location other than the head of) the queue 175. The second customer 110 may be located at a second distance from the point of sale terminal(s) 135. As an example, the second customer 110 may be located at a distance from the point of sale terminal(s) 135 that is sufficient for the second customer device(s) 130 to communicate with the media hub(s) 140 using the techniques described herein. The second customer 110 may, but need not, be sufficiently close to the point of sale terminal(s) 135 to provide cash, credit and/or other payment cards, and/or mobile payments to the point of sale terminal(s) 135. The spacing between the second customer 110 and the first customer 105 may include any convenient distance. In some implementations, the second customer 110 is spaced from the first customer 105 by as little as several (e.g., one to five) feet, as may be common in the queues of some supermarkets or drug stores. In various implementations, the second customer 110 is spaced from the first customer 105 by several or more yards, as may be common in the queues of many clothing stores or stores (e.g., some drug stores) where the first customer 105 is provided privacy about specific items the first customer 105 may be purchasing.

The cashier 115 may comprise a person who manages the point of sale terminal(s) 135. The cashier 115 may include an employee, contractor, affiliate, etc. of the facility 170. It is noted that although FIG. 1A shows the cashier 115 as a person, various implementations need not include a person to manage the point of sale terminal(s) 135. More specifically, as noted above, and as discussed further herein, the point of sale terminal(s) 135 need not be managed by a person, but may rather comprise an automated terminal that facilitates purchase of items without human intervention.

The administrator 120 may include a person who administers the administrator device 145. The administrator 120 may comprise an employee, contractor, affiliate, etc. of the facility 170 or of an entity that owns, manages, etc. the facility 170. In some implementations, the administrator 120 includes network management personnel, security management personnel, marketing personnel, etc. Though FIG. 1A shows the administrator 120 as located within the facility 170, it is noted that in various implementations, the administrator 120 may be located outside the facility 170. For example, the administrator 120 may be located at a remote location that is connected to the devices in the facility 170 (e.g., media hub(s) 140, the administrator device 145, etc.) through the computer network 150. It is further noted that while FIG. 1A shows a single administrator 120, the element 120 may represent a plurality of individuals and/or groups that administer the administrator device 145. Further, the administrator 120 may not be integral to the operation of the system and may, therefore, be present only in select circumstances (e.g., for equipment deployment, maintenance, etc.), if at all.

The first customer device(s) 125 may include one or more digital devices associated with the first customer 105. In some implementations, the first customer device(s) 125 include components, such as memory and at least one processor, of a computer system, such as the computer system 1000 shown in FIG. 10. The first customer device(s) 125 may comprise, for instance, one or more of a mobile phone, a tablet computing device, or other mobile computing device. In some implementations, the first customer device(s) 125 may be configured to facilitate payments (e.g., mobile payments) to the point of sale terminal(s) 135. The first customer device(s) 125 may also be configured to include locational hardware (Global Positioning System (GPS) circuitry, Bluetooth Low Energy (BLE) circuitry, wireless network triangulation circuitry, etc.) and/or software that allows locations of the first customer device(s) 125 to be identified by the media hub(s) 140 and/or other devices in the facility 170. The first customer device(s) 125 may further support applications, such as mobile applications (e.g., mobile applications supported by marketers and/or merchants). In some implementations, the first customer device(s) 125 includes hardware and/or software that allow barcodes, Quick Response (QR) codes, etc. to be scanned.

The second customer device(s) 130 may include one or more digital devices associated with the second customer 110. The second customer device(s) 130 may include components, such as memory and at least one processor, of a computer system, such as the computer system 1000 shown in FIG. 10. The second customer device(s) 130 may include one or more of a mobile phone, a tablet computing device, a laptop computer, or other mobile computing device. The second customer device(s) 130 may further include locational hardware and/or software that allow locations of the second customer device(s) 130 to be identified by the media hub(s) 140 and/or other devices in the facility 170. The second customer device(s) 130 may further support applications, such as mobile applications and/or include hardware and/or software that allow barcodes, QR codes, etc. to be scanned.

The second customer device(s) 130 may be coupled to the media hub(s) 140 using a peer-to-peer connection or other connection. For instance, as discussed further herein, the second customer device(s) 130 may be coupled to the media hub(s) 140 over a BLE connection that provides the media hub(s) 140 with locations of the second customer device(s) 130 in the facility 170.

The point of sale terminal(s) 135 may include one or more digital devices configured to facilitate payments for items in the facility 170. The point of sale terminal(s) 135 may include components, such as memory and at least one processor, of a computer system, such as the computer system 1000 shown in FIG. 10. The point of sale terminal(s) 135 may further include one or more of a mobile phone, a tablet computing device, a laptop computer, a desktop computer, a server, or some combination thereof. The point of sale terminal(s) 135 may include a register that receives cash, credit and/or other payment cards, and/or mobile payments for items customers are purchasing. The point of sale terminal(s) 135 may be coupled to the computer network 150. As discussed further herein, the point of sale terminal(s) 135 may provide information to and receive information from the media hub(s) 140 over the computer network 150. As also discussed further herein, the point of sale terminal(s) 135 may be supported by the sale management system 155. In various implementations, each point of sale terminal(s) 135 may be located at the end of a corresponding checkout lane in the facility 170.

According to one implementation of the invention, and as noted above, the media hub(s) 140 may comprise a stand-alone device that may be connected directly or wirelessly to an (in-store) in-lane printer or other system component.

Alternatively, the media hub(s) 140 may comprise a component of another device located at the POS such as, for example, a printer. The media hub(s) 140 may, for instance, comprise a wireless printer that includes a printer control component and a separate controller (or other components) that enable the identified features and functions of the media hub. One advantage of the wireless printer is that it avoids the need for cables to connect the printer to an in-store server. Another advantage is the ability to make the printers self-configuring as described herein. Additionally, the media hub may be updated (e.g., new functionality and or applications added) wirelessly and/or remotely.

Figure 10:
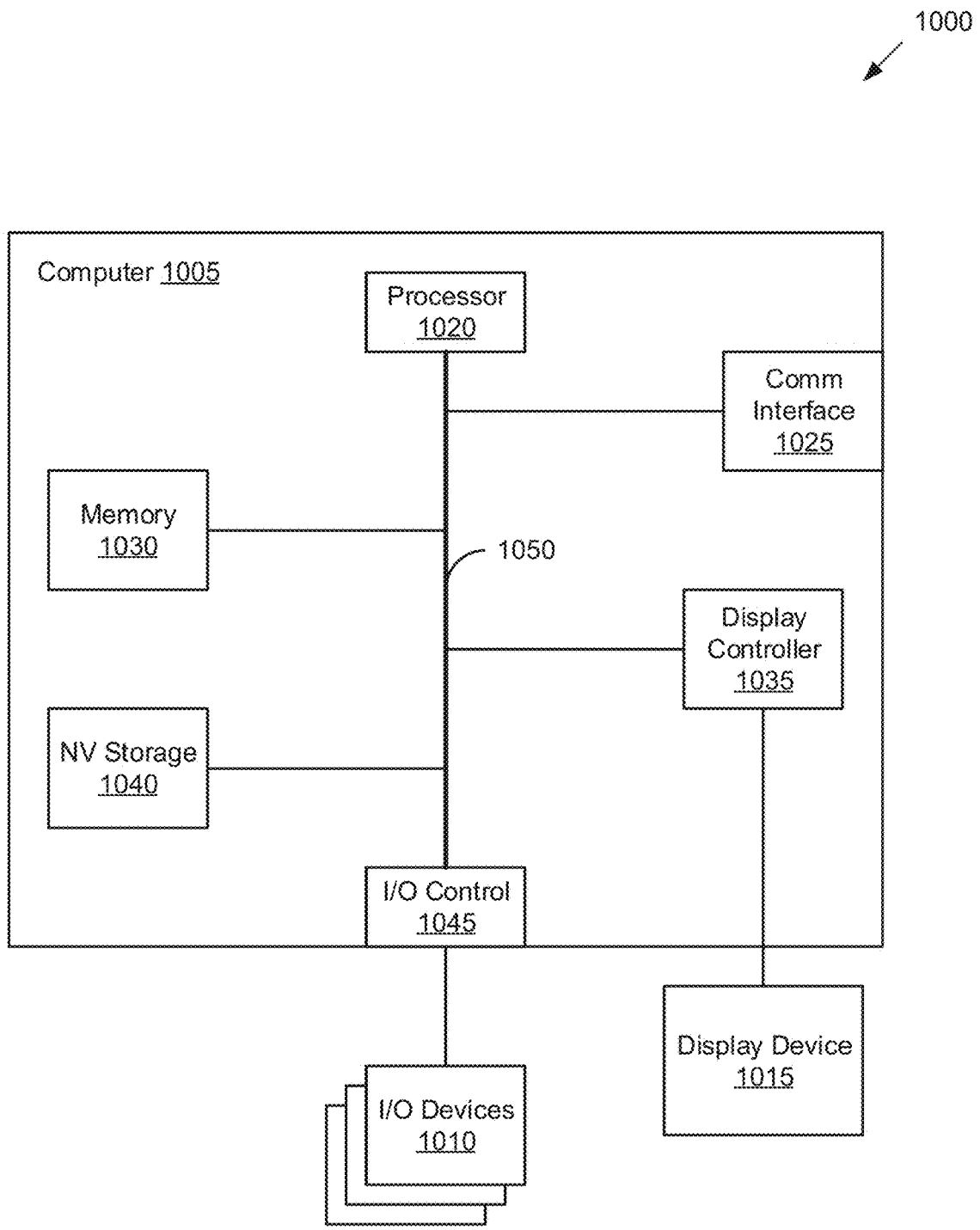
FIG. 10 is an exemplary depiction of a computer system, according to an implementation of the invention.

The media hub(s) 140 may include components, such as memory and at least one processor, of a computer system, such as the computer system 1000 shown in FIG. 10. In some implementations, the media hub(s) 140 may further include docking stations, storage (e.g., flash or other memory drives), network cards (e.g., Ethernet and/or smart network cards), etc.

In some implementations, the media hub(s) 140 may comprise a motherboard having the memory and the at least one processor incorporated thereon. The motherboard of the media hub(s) 140 may further include network access hardware that supports connections to the computer network 150 and/or other devices in the facility 170. For example, in some implementations, the motherboard of the media hub(s) 140 may include hardware that supports a wireless network connection (e.g., an 802.11 WiFi connection, a cellular data connection, etc.), and/or a wired network connection (e.g., an Ethernet connection, a DSL connection, etc.). The wireless network connection and/or the wired network connection may allow data to be transmitted to and received from the point of sale terminal(s) 135 or other system components.

In various implementations, the motherboard of the media hub(s) 140 may include hardware that supports BLE and/or 802.11 WiFi connections to one or more customer devices (e.g., to the first customer device(s) 125 and/or the second customer device(s) 130). The BLE and/or 802.11 WiFi connections may help identify locations of the customer devices using the techniques described herein. In various implementations, the motherboard of the media hub(s) 140 may further include peripheral components, such as printers that can be used to print coupons, bar codes, QR codes, etc.

Figure 3:
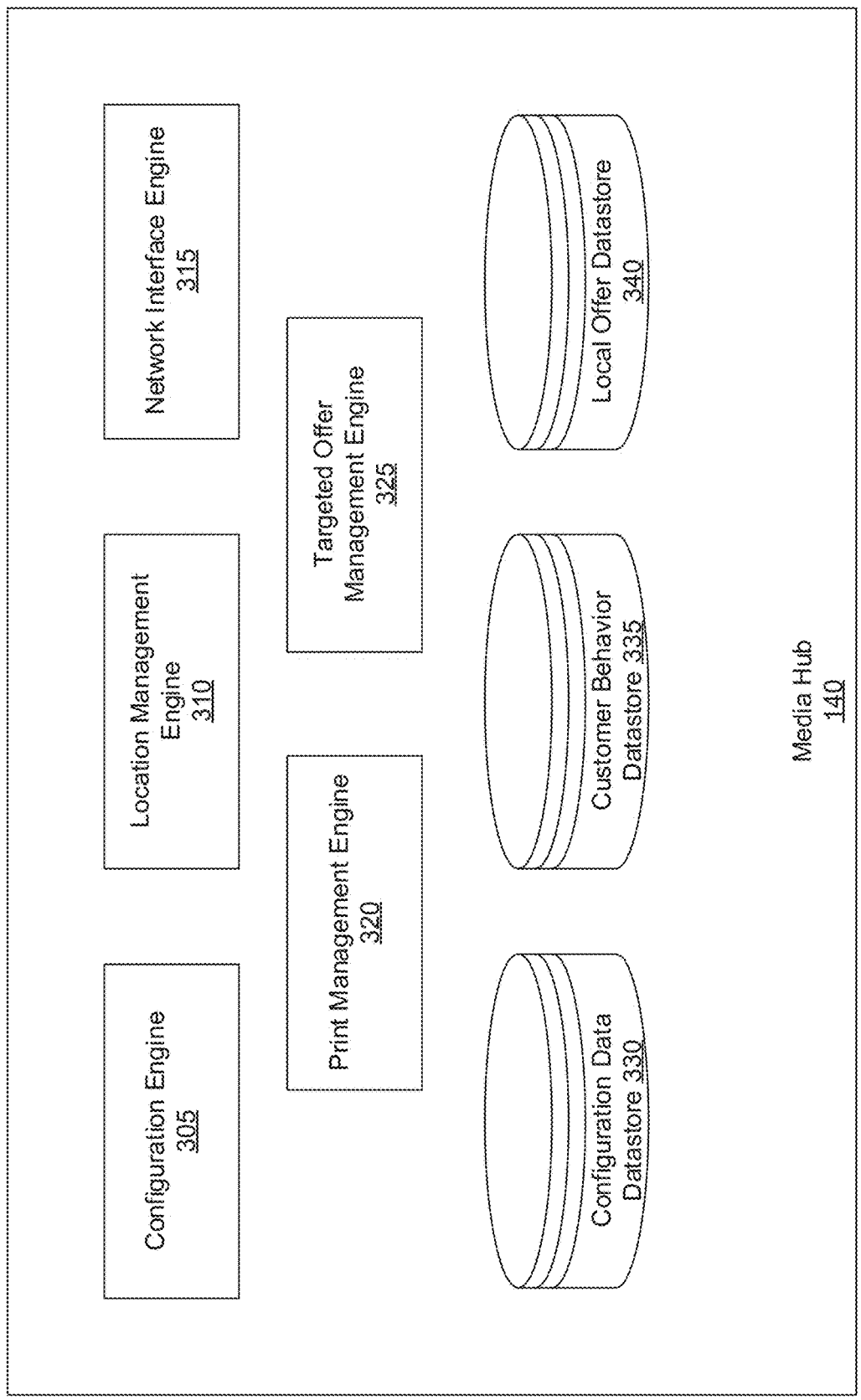
FIG. 3 is an exemplary depiction of a media hub, according to an implementation of the invention.

In some implementations, as noted above, a plurality of media hub(s) 140 may be located at different locations in the facility 170. As an example, in some implementations, each of a plurality of the media hub(s) 140 may be located near each of a plurality of the point of sale terminal(s) 135. Each of the plurality of media hub(s) 140 may be associated with each of the plurality of the point of sale terminal(s) 135. Example associations include one-to-one associations and associations where one of the media hub(s) 140 is associated with a plurality of the point of sale terminal(s) 135. FIG. 3 shows the media hub device 140 in greater detail. Other configurations may be implemented.

According to an implementation of the invention, the media hub(s) 140 may be configured to provide targeted media to customer devices within the facility 170. Targeted media may include a "targeted offer," which may refer to any offer or inducement to purchase an item and/or service that is targeted to specific customers based on the customers' behavior, historical or current actions, and/or other factors related to the customers. Items and/or services associated with targeted offers from the media hub(s) 140 may or may not be located within the facility 170. Moreover, items and/or services associated with targeted offers from the media hub(s) 140 may or may not be sold by merchants who manage the facility 170. Examples of targeted offers include advertisements, coupons, inducements, offers, etc. that are provided to customer devices over the computer network 150 (e.g., to a mobile application on a customer device).

The administrator device 145 may include one or more digital devices configured to allow the administrator 120 to control the media hubs(s) 140. The administrator device 145 may include components, such as memory and at least one processor, of a computer system, such as the computer system 1000 shown in FIG. 10. The administrator device 145 may further include one or more of a networked phone, a tablet computing device, a laptop computer, a desktop computer, a server, or some combination thereof. In various implementations, the administrator device 145 allows the administrator 120 to install instances of the media hub(s) 140, configure instances of the media hub(s) 140, and identify offers and/or targeting information related to targeted offers from the media hub(s) 140. The administrator device 145 may be supported by the offer management system 160, as described further herein.

The computer network 150 may comprise any computer network. The computer network 150 may include a networked system that includes several computer systems coupled together, such as the Internet. The term "Internet" as used herein refers to a network of networks that uses certain protocols, such as the TCP/IP protocol, and possibly other protocols such as the hypertext transfer protocol (HTTP) for hypertext markup language (HTML) documents that make up the World Wide Web (the web). Content is often provided by content servers, which are referred to as being "on" the Internet. A web server, which is one type of content server, is typically at least one computer system which operates as a server computer system and is configured to operate with the protocols of the web and is coupled to the Internet. The physical connections of the Internet and the protocols and communication procedures of the Internet and the web are well known to those of skill in the relevant art. In various implementations, the computer network 150 may be implemented as a computer-readable medium, such as a bus, that couples components of a single computer together. For illustrative purposes, it is assumed the computer network 150 broadly includes, as understood from relevant context, anything from a minimalist coupling of the components illustrated in the example of FIG. 1, to every component of the Internet and networks coupled to the Internet.

In various implementations, the computer network 150 may include technologies such as Ethernet, 802.11, worldwide interoperability for microwave access (WiMAX), 3G, 4G, CDMA, GSM, LTE, digital subscriber line (DSL), etc. The computer network 150 may further include networking protocols such as multiprotocol label switching (MPLS), transmission control protocol/Internet protocol (TCP/IP), User Datagram Protocol (UDP), HTTP, simple mail transfer protocol (SMTP), file transfer protocol (FTP), and the like. The data exchanged over the computer network 150 can be represented using technologies and/or formats including HTML and extensible markup language (XML). In addition, all or some links can be encrypted using conventional encryption technologies such as secure sockets layer (SSL), transport layer security (TLS), and Internet Protocol security (IPsec). In some implementations, the computer network 150 comprises secure portions. The secure portions of the computer network 150 may correspond to a networked resources managed by an organization, networked resources that reside behind a specific gateway/router/switch, networked resources associated with a specific Internet domain name, and/or networked resources managed by a common Information Technology ("IT") unit.

The sale management system 155 may include one or more digital devices configured to support the point of sale terminal(s) 135. The sale management system 155 may include components, such as memory and at least one processor, of a computer system, such as the computer system 1000 shown in FIG. 10. The sale management system 155 may further include one or more servers (e.g., dedicated servers, shared servers, distributed servers, etc.). In various implementations, the sale management system 155 provides the point of sale terminal(s) 135 with quantity, price, and other information related to items in the facility 170. The sale management system 155 may also support payments for items purchased at the point of sale terminal(s) 135. The sale management system 155 may be coupled to the computer network 150. In various implementations, the sale management system 155 may provide information related to purchases (e.g., receipts of purchases) to the customer device(s). For example, in some implementations, the sale management system 155 may provide receipts related to purchases made at the point of sale terminal(s) 135 to a mobile application on the customer device(s).

Figure 2:
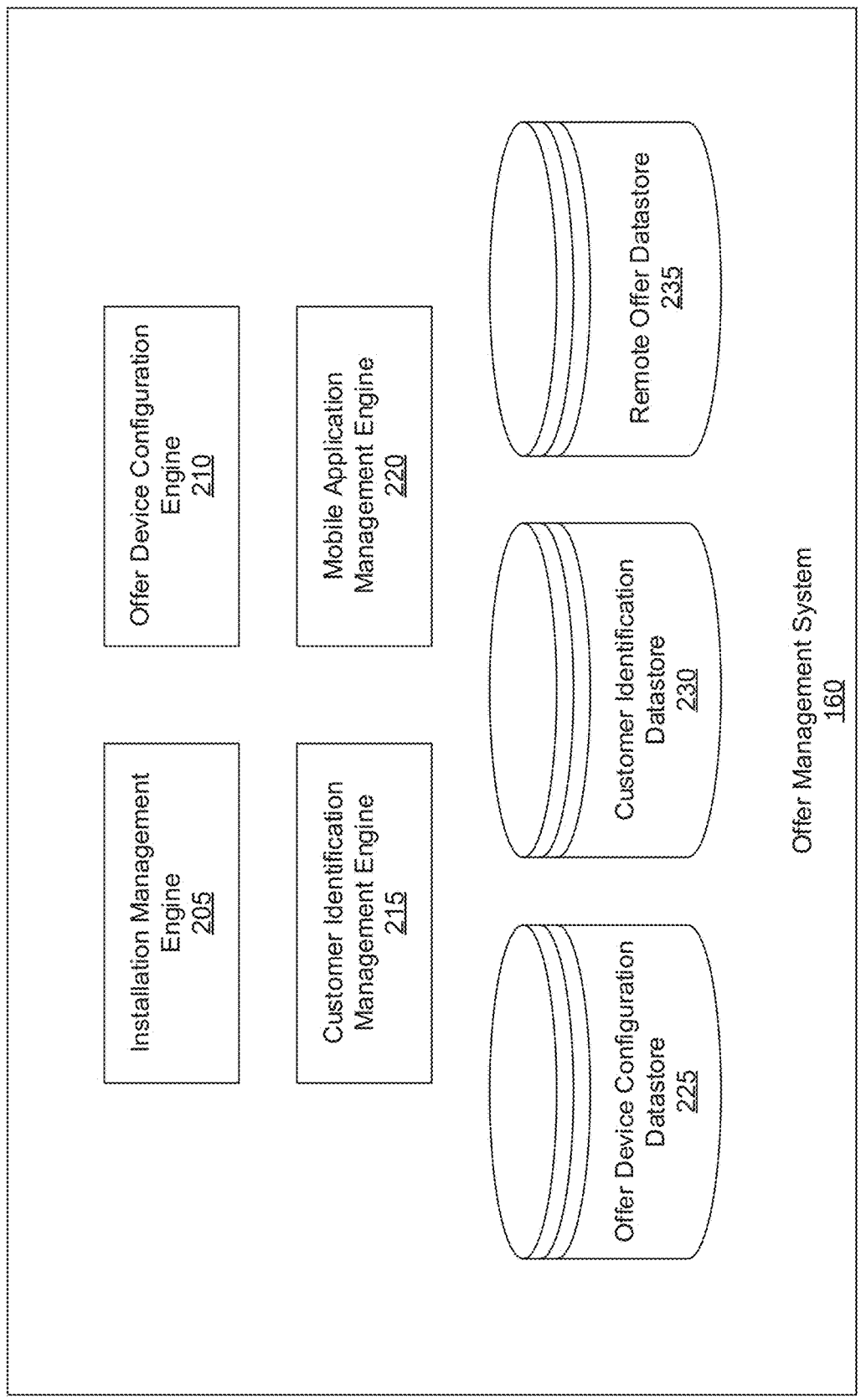
FIG. 2 is an exemplary depiction of an offer management system, according to an implementation of the invention.

The offer management system 160 may include one or more digital devices configured to support the media hub(s) 140. The offer management system 160 may include components, such as memory and at least one processor, of a computer system, such as the computer system 1000 shown in FIG. 10. The offer management system 160 may further include one or more servers (e.g., dedicated servers, shared servers, distributed servers, etc.). FIG. 2 shows the offer management system 160 in greater detail.

Although FIG. 1A shows the media hub(s) 140 and the offer management system 160 as separate from one another, it is noted that in various implementations, the functionalities of the media hub(s) 140 and the offer management system 160 may be incorporated into a single device. The single device may be located within the facility 170 or may be coupled to devices in the facility 170 over the computer network 150. In still other implementations, the media hub(s) 140 may be programmed with some of the functionalities of the offer management system 160, and vice versa. In this regard, the functionalities (e.g., remote device self-configuration, peer configuration management, mobile device identification system, and cross-channel shopper targeting system) attributed herein to either the media hub(s) 140 and the offer management system 160 are not limiting, as each may be programmed with some or all of the functionality attributed to the other, or to other system components, as would be appreciated.

One or more of the system components of mobile marketing environment 100A may operate to provide targeted offers to the first customer device(s) 125 and/or the second customer device(s) 130. In some implementations, the administrator 120 may unpackage, and/or place the media hub(s) 140 near the point of sale terminal(s) 135. The administrator 120 may configure the media hub(s) 140 to access the computer network 150. Once configured to access the computer network 150, the media hub(s) 140 may connect to the offer management system 160, and ask the offer management system 160 to provide installations and/or configuration data for the media hub(s) 140.

In some implementations, the offer management system 160 obtains device information (serial numbers, Media Access Control (MAC) addresses, Internet Protocol (IP) addresses, etc.) from the media hub(s) 140. The offer management system 160 may store the device information for later use and/or operation. The offer management system 160 may further request the administrator 120 specify a location of each of the media hub(s) 140 in the facility 170. In various implementations, the administrator 120 may specify, e.g., a lane number, physical coordinates, the identifier of the point of sale terminal(s) 135 near the media hub(s) 140, etc. The offer management system 160 may register the device information and/or the location of the media hub(s) 140. The offer management system 160 may further provide the media hub(s) 140 with datastores that store information related to targeted offers, configurations, and/or customer behavior that is to be monitored.

According to an implementation of the invention, the offer management system 160 may further create logical groups of the media hub(s) 140. The logical groups may arrange the media hub(s) 140 into various topologies, e.g., star topologies, master-slave topologies, etc. Each logical group may provide targeted offers to customer devices in the facility 170. The logical group of devices may share attributes, such as portions of network addresses and/or subnets. In some implementations, the logical group of devices has a name that identifies the group to the customer devices (e.g., the first customer device 125 and the second customer device 130) and/or the administrator device 145. In some implementations, when one of the media hub(s) 140 in a logical group fails, other ones of the media hub(s) 140 may continue to communicate with customer devices that the failed media hub(s) 140 was previously communicating with.

Once configured, the media hub(s) 140 may monitor attributes (locations, device identifiers, etc.) of the first customer device(s) 125 and/or the second customer device(s) 130. In some implementations, customers line up in the facility 170 to purchase items. As an example, the first customer 105 and the second customer 110 may enter into the queue 175. As noted herein, spacing between the first customer 105 and the second customer 110 may depend on the layout of the facility 170, and can vary from several feet in facilities that do not afford the first customer 105 much privacy regarding purchases to several yards in facilities that afford the first customer 105 more privacy regarding purchases.

In one implementation, the offer management system 160 may recognize specific customers based on properties of each of the customer devices. As an example, the offer management system 160 may recognize that a group of customer devices are moving through the facility together. The offer management system 160 may instruct the media hub(s) 140 to obtain device identifiers for those customer devices. The offer management system 160 may further evaluate whether one of those customer devices are associated with a known customer. If so, the offer management system 160 may, in some implementations, associate all of those devices with the known customer so that targeted offers can be targeted to the known customer using all of those customer devices.

In some implementations, the offer management system 160 may configure the media hub(s) 140 to enroll new customers to target for targeted offers. More specifically, the offer management system 160 may determine that attributes of a customer and/or customer device have not been previously received. In those circumstances, the offer management system 160 may instruct the media hub(s) 140 to print a barcode, QR code, etc. to provide to the unknown customer(s). As an example, the barcode, QR code, etc. may be printed along with a paper receipt printed by the point of sale terminal(s) 135. Once scanned, the barcode, QR code, etc. may direct the unknown customer to a mobile application managed by the offer management system 160. The mobile application may instruct the unknown customer to enroll with the offer management system 160. It is noted the example of a paper barcode, QR code, etc. is by way of example only, and that in various implementations, the offer management system 160 provides the unknown customer with an electronic link (e.g., through text message or in a mobile application) to enroll with the offer management system 160.

The media hub(s) 140 may provide specific targeted offers to customers. As noted, the targeted offers may be targeted to customers based on the location of the customers and/or past behavior (past purchases, past histories, etc.) of the customers. In some implementations, the media hub(s) 140 interfaces with a mobile application on the customer devices (e.g., the first customer device(s) 125 and/or the second customer device(s) 130), and presents targeted offers in the mobile application. The media hub(s) 140 (and/or the offer management system 160) may further instruct the point of sale management system 155 to direct receipts related to purchases to the mobile application on the customer device(s). Advantages to directing receipts to the mobile application include ensuring the receipts are secure from third-parties, such as email providers that crawl emails of account holders.

According to an implementation of the invention, mobile marketing environment 100B of FIG. 1B includes the cashier 115, the administrator 120, the media hub device 140, the administrator device 145, the computer network 150, and the offer management system 160. In this implementation, the media hub device 140 may include a dedicated offer platform module 141, which in turn may include a dedicated offer platform application 142. The dedicated offer platform module 141 may include an operating system, drivers, etc. needed to support the media hub device 140 on a distinct motherboard. The dedicated offer platform application 142 may include an application, processes, etc. to perform the functionalities described herein. The administrator device 145 may include a browser 146, from which the administrator 120 may take actions described herein.

The offer management system 160 may include a retailer website module 161, a first web services module 162, a second web services module 163, a new store setup datastore 164, and an existing store database 165. The first web services module 162 may allow new stores to be set up for dedicated offer support services. The first web services module 162 may store and/or gather relevant data in the new store setup datastore 164. The second web services module 163 may allow already enrolled stores to use dedicated offer support services. The second web services module 163 may store and/or gather relevant data in the existing store database 165.

FIG. 1C is an exemplary depiction of mobile marketing environment 100c which may include retailers 105c, manufacturers 110c, cloud service providers 115c, and email service providers 120c. In various implementations, the elements of the mobile marketing environment 100C may operate to provide targeted offers to a customer.

Offer Management System

FIG. 2 is an exemplary depiction of an offer management system 160. As noted above, in various implementations, the functionalities of the offer management system 160 and the media hub(s) 140 may be incorporated into a single device. In still other implementations, the offer management system 160 may be programmed with some of the functionalities of the media hub(s) 140, and vice versa. In this regard, the functionalities attributed herein to the offer management system 160 and the media hub(s) 140 are not limiting, as each may be programmed with some or all of the functionality attributed to the other, or to other system components, as would be appreciated.

In the non-limiting depiction of FIG. 2, the offer management system 160 includes an installation management engine 205, an offer device configuration engine 210, a customer identification management engine 215, a mobile application management engine 220, an offer device configuration datastore 225, a customer identification datastore 230, a remote offer datastore 235, and/or other components.

The installation management engine 205 may be configured to provide installation settings related to media hub(s) 140. More specifically, the installation management engine 205 may be configured to identify properties (device identifiers, locations such as lane numbers, etc.) of new media hub(s) 140 that are to be installed. In some implementations, the installation management engine 205 provides the administrator device 145 with user interface elements (e.g., Graphical User Interface (GUI) elements) that guide the administrator 120 through installing one of the media hub(s) 140. The installation management engine 205 may further store portions of identified properties of media hub(s) 140 as configuration data in the offer device configuration datastore 225. In some implementations, the installation management engine 205 gathers sets of targeted offers from the remote offer datastore 235, and loads the sets of targeted offers onto the media hub(s) 140.

The offer device configuration engine 210 may be configured to manage configurations of the media hub(s) 140. More specifically, the offer device configuration engine 210 may monitor configurations of the media hub(s) 140 and determine whether these configurations are in accordance with appropriate configuration data in the offer device configuration datastore 225. In some implementations, the offer device configuration engine 210 manages logical groups of media hub(s) 140. For example, the offer device configuration engine 210 may instruct one or more of the media hub(s) 140 to be configured to take the place of another of the media hub(s) 140 if the other media hub(s) 140 has been incorrectly configured, disconnected from the computer network 150, or powered down.

The customer identification management engine 215 may be configured to identify customers based on customer identification data. In some implementations, the customer identification management engine 215 gathers customer identification data from the customer identification datastore 230, such as information related to customers' backgrounds, past purchases, locations, and specific customer devices associated with known customers. The customer identification management engine 215 may further be configured to select specific properties of customer identification data that can form the basis of customer identification. In an implementation, the customer identification management engine 215 statistically analyzes the customer identification data for factors that can be correlated with customer identification. For example, the customer identification management engine 215 may implement a histogram that correlates customer identification data with customer identities. In some implementations, the customer identification management engine 215 may discover shopper identities from multiple channels and pair up these identities by identifying coinciding time slots and/or coinciding locations over multiple visits.

In some implementations, the customer identification management engine 215 implements identity filters that remove information that may lower correlations between customer devices and customer identities. Examples of the types of information that may be filtered include false positives due to counter and/or loyalty cards, false positives due to resident devices that are not used by a specific customer or are near the specific customer but not used by the specific customer, and false positives due to customer devices that vacillate between being in-range of the media hub(s) 140 and out-of-range of the media hub(s) 140. In various implementations, the customer identification management engine 215 may further consider how recent customer devices were observed when implementing the identity filters.

The mobile application management engine 220 may be configured to manage a mobile application on the customer devices (e.g., one or more of the first customer device(s) 125 and the second customer device(s) 130). More specifically, the mobile application management engine 220 may install a mobile application on customer devices, create secure connections to a mobile application on customer devices and/or manage secure connections to a mobile application on customer devices. The mobile application management engine 220 may further manage customer account settings, network configuration data, and/or other settings of the mobile application on the customer devices.

The offer device configuration datastore 225 may store configuration data related to the media hub(s) 140. In various implementations, the configuration data in the offer device configuration datastore 225 includes device identifiers of media hub(s) 140 that have been installed in various facilities. The configuration data may further include location(s) of media hub(s) 140, specific facilities in which media hub(s) 140 have been installed, and point of sale terminals near specific media hub(s) 140. In some implementations, the configuration data includes logical groups to which specific dedicated network offer terminal(s) 140 have been associated.

The customer identification datastore 230 may store customer identification data related to the behavior of specific customers. Customer identification data may include information related to customers' backgrounds, past purchases, locations, and specific customer devices associated with known customers. The customer identification data may have been based on information from loyalty or rewards programs used for past purchases and/or information from known customer devices that have been associated with past purchases. As discussed herein, the customer identification data may assist in creating a histogram that allows the customer identification management engine 215 to identify the customer devices a specific customer may or may not be using.

The remote offer datastore 235 may store a master set of targeted offer data. The master set of targeted offer data may include data related to targeted offers for a variety of merchants, facilities, industries, etc. The master set of targeted offer data may include data related to targeted offers that are loaded onto a variety of media hub(s) 140 in response to initialization and/or configuration of the media hub(s) 140. The remote offer datastore 235 may be updated periodically, upon specified events, etc.

The offer management system 160 may operate to configure and/or manage the media hub(s) 140 to provide customer devices with targeted offers. In some implementations, the installation management engine 205 receives instructions from the administrator device 145 to install the media hub(s) 140 in the facility 170. The installation management engine 205 may receive a device identifier of specific media hub(s) 140 that are to be installed in the facility. The installation management engine 205 may further receive a location (e.g., a lane number, physical coordinates, the identifier of the point of sale terminal(s) 135 near the media hub(s) 140, etc.) of the specific media hub(s) 140 that are to be installed in the facility. The installation management engine 205 may further obtain from the offer device configuration datastore 225 configuration data for the specific media hub(s) 140 and may provide the configuration data to the specific media hub(s) 140.

The offer device configuration engine 210 may manage configurations of the media hub(s) 140. More specifically, the offer device configuration engine 210 may monitor configurations of the media hub(s) 140 to determine whether configurations are in line with the configuration data in the offer device configuration datastore 225. The offer device configuration engine 210 may further identify whether targeted offers in the remote offer datastore 235 have been updated, and if so, may push updated targeted offers to the media hub(s) 140.

In some implementations, the offer device configuration engine 210 manages logical groups of the media hub(s) 140. As an example, the offer device configuration engine 210 may create, modify, etc. configuration data of the media hub(s) 140 so that the media hub(s) 140 can be organized into logical groups. The offer device configuration engine 210 may further update configurations of the media hub(s) 140 if a member of a logical group fails or is brought offline. As an example, the offer device configuration engine 210 may configure another member of a logical group with the configuration data of a failed member of a logical group. Such processes may ensure automated replication of failed media hub(s) 140 configurations to replacement devices.

The customer identification management engine 215 may operate to identify specific customers based on customer behavior. In some implementations, the customer identification management engine 215 retrieves customer identification data from the customer identification datastore 230. The customer identification management engine 215 may further correlate customer behavior with the identities of specific customers. As an example the customer identification management engine 215 may retrieve device identifiers of a plurality of devices known to be associated with a specific customer. The customer identification management engine 215 may further create a statistical model (e.g., a histogram) of all devices that are likely to correlate with the specific customer. The customer identification management engine 215 may identify threshold values in the statistical model (e.g., cutoffs) above which devices are likely to correspond with a specific customer. The customer identification management engine 215 may further implement identity filters to ensure the validity of the data in the statistical model. The customer identification management engine 215 may provide other modules with the identities of specific customers and/or devices likely to be correlated with the specific customers.

The mobile application management engine 220 may operate to manage a mobile application on customer devices. In various implementations, the mobile application management engine 220 manages a secure connection (e.g., an encrypted connection) between the mobile application and/or other devices, such as the point of sale terminal(s) 135 and the media hub(s) 140. As an example, the mobile application management engine 220 may receive receipts from the point of sale terminal(s) 135 and may incorporate these receipts into an electronic format that can be displayed on a mobile application in the customer devices. As another example, the mobile application management engine 220 may configure a mobile application on customer devices to display targeted offers to customers. Advantageously, such a secure connection may limit the ability of third party applications (e.g., third party web browsers, third party email clients, etc.) from identifying the contents of communications to the mobile application.

In various implementations, the mobile application managed by the mobile application management engine 220 enrolls new customers for targeted offers. More specifically, the mobile application may receive customer identification data from a new customer who has not yet received targeted offers but wants to receive targeted offers. The mobile application may further store the customer identification data in the customer identification datastore 230. The mobile application may also create a new account for the new customer, and may enable the customer to receive targeted offers when the customer attempts to purchase items at a point of sale terminal in the future.

Media Hub

FIG. 3 is an exemplary depiction of a media hub device 140, according to an implementation of the invention. As noted above, in various implementations, the functionalities of the media hub(s) 140 and the offer management system 160 may be incorporated into a single device. In still other implementations, the media hub(s) 140 may be programmed with some of the functionalities of the offer management system 160, and vice versa. In this regard, the functionalities attributed herein to the media hub(s) 140 and the offer management system 160 are not limiting, as each may be programmed with some or all of the functionality attributed to the other, or to other system components, as would be appreciated.

According to an implementation of the invention the media hub device 140 may be configured in an "out-of-the-box" solution in which the media hub device 140, upon startup, obtains configuration data from a remote device, such as via an administrator device connected to the media hub device 140 via short-range wireless connection or an offer management system connected to the media hub device 140 via a wide area network. Peer media hub device(s) 140 may be connected to one another via a local network and may each be self-configured in the same manner. Each media hub device 140 may monitor other media hub device(s) 140 on the local network. Based on such monitoring, each media hub device 140 may detect that one of the media hub device(s) 140 is offline and a new media hub device 140 is online. One or more of the online media hub device(s) 140 may automatically configure the new media hub device 140 by transmitting configuration data to the newly discovered online media hub device 140. In some instances, the offline media hub device 140's configuration data may be transmitted to the new media hub device 140, thereby configuring the new media hub device 140 to replace the offline media hub device 140.

According to an implementation of the invention, a device, referred to herein as a "media hub" or "media hub device" may be deployed at a location of a retail store or other facility ("deployment location" or "deployed location"). For example, a media hub device 140 may be deployed in each check-out lane (or other checkout area or station) of a retail store, and may be configured to perform various functions associated with other in-store devices (e.g., other media hubs 140 in nearby check-out lanes, or other system components), as well as functions associated with a customer's activities in a retail store, as described in greater detail herein.

According to an implementation of the invention, a given media hub device 140 may be "self-configuring" in that it requires minimal to no manual configuration by a user to become operational (i.e., perform the various functions described herein), may be automatically configured by an already operational peer media hub device 140 with minimal to no manual configuration by a user, and/or may automatically update its configuration data without user intervention.

According to an implementation of the invention, one or more media hubs 140 may each configure itself during an initial setup of a retail store or other location. For example, a retailer (e.g., an administrator of the retailer) associated with a retail store may register to use the system. During such registration (or thereafter), the retailer may select various media, including general media and retailer-specific media, to provide through its media hubs 140. The retailer may also provide various rules, configuration data, threshold values, and/or other information described herein relating to its media hubs 140. The system may store the foregoing information so that media hubs 140 associated with the retailer may be configured automatically based on the information provided by the retailer. For example, a media hub device 140 of a retailer may obtain a network address of an offer management system and, when connected to a network (e.g., a WiFi network of a retail store), communicate with the offer management system via the network using the network address. The network address may be obtained from a pre-stored memory of the media hub device 140 or may be obtained from an administrator device that is used to perform an initial setup of the retail store. The offer management system may provide (and the media hub device 140 may receive), configuration data used to configure the media hub device 140. Such configuration data may include configuration data that was previously provided by the retailer (e.g., during registration of the retailer to use the system or thereafter). The media hub device 140 may configure itself using the configuration data to become operational.

According to an implementation of the invention, when an initial setup of a retail store or other location has been completed, and a group of media hubs 140 have been initially configured, during operation, each media hub device 140 may monitor a status of other media hubs 140 in the group. If a media hub device 140 detects or otherwise discovers a new media hub device 140 (e.g., one that was not previously known), then the media hub device 140 may provide configuration data for the newly detected media hub device 140. The newly detected media hub device 140 may use such configuration data to become operational.

According to an implementation of the invention, a media hub device 140 may detect that another previously known media hub device 140 in the group has no longer been detected for a threshold period of time. Either before or after the previously known media hub device 140 in the group has no longer been detected, the media hub device 140 may detect a new media hub device 140 and may assume that the new media hub device 140 should replace the previously known media hub device 140. As such, the media hub device 140 may provide the configuration data relating to the previously known media hub device 140 to the new media hub device 140 such that the new media hub device 140 is able to replace the previously known media hub device 140.

According to an implementation of the invention, to prevent multiple media hubs 140 in the group from configuring the new media hub device 140, each media hub device 140 may configure other media hubs 140 in accordance with a peer configuration rule or trigger (e.g., a rule that assigns peer(s) to a media hub device 140 with which the media hub device 140 is responsible to configure, a first-to-detect rule in which a media hub device 140 that first detects that a replacement should occur is responsible for configuring the new media hub device 140, an explicit indication from an administrator for one media hub device 140 to configure another media hub device 140, etc.).

According to an implementation of the invention, multiple media hubs 140 may automatically configure a newly detected media hub device 140 in a cooperative, centralized or decentralized peer-to-peer, fashion. In these instances, the new media hub device 140 may obtain various portions of its configuration data from multiple peer media hubs 140. For example, a first portion of the configuration data may be obtained from a first peer media hub device 140 and a second portion of the configuration data may be obtained from a second peer media hub device 140. The new media hub device 140 may then generate the full configuration data based on the first and second portions. Of course, the foregoing requires that the first and second peer media hubs 140 each have a copy (or at least portions) of the same configuration data intended for the new media hub device 140. The first peer media hub device 140, the second peer media hub device 140, other peer media hubs 140 participating in the peer-to-peer configuration operation, or the new media hub device 140 may act as a central controller that coordinates which peer media hub device 140 is to provide particular portions of the configuration data intended for the new media hub device 140. In the peer-to-peer model, a given media hub device 140 may provide at least a portion of the configuration data (e.g., the configuration data of a media hub device 140 to be replaced) to the new media hub device 140.

According to an implementation of the invention, upon determining that a peer media hub device 140 is missing from the known peer media hub device(s) 140, a media hub device 140 may transmit an alert to a remote system indicating that the second media hub device 140 has not been detected. The remote system may include an offer management system or an administrator device.

A media hub device 140 may comprise its own motherboard with one or more dedicated processors, memory, buses, peripherals, etc. A media hub device 140 may have its own operating system that runs processes, applications, etc., and may serve as an in-lane platform that can perform the functionality set forth herein along with future functionality. The media hub device 140 may comprise one or more self-configuring wireless device(s) to reduce the need for manual set-up or configuration.

In one implementation of the invention, the media hub device 140 may comprise a stand-alone device that may be connected directly or wirelessly to an (in-store) in-lane printer or other system component.

Alternatively, the media hub device 140 may comprise a component of another device located at the POS such as, for example, a printer. In one implementation, for instance, the media hub device 140 may comprise a wireless printer that includes a printer control component and a separate controller (or other components) that enable the identified features and functions of the media hub device 140. Other configurations may be implemented. One advantage of the wireless printer is that it avoids the need for cables to connect the printer to an in-store server. Another advantage is the ability to make the printers self-configuring as described herein. Additionally, the media hub device 140 may be updated (e.g., new functionality and or applications added) wirelessly and/or remotely.

According to an implementation of the invention, media hub device 140(s) may be coupled to a local network (e.g., a local area network, a wireless network, a cellular data network, etc.) in a retail facility. The network may track locations of customers in the facility (e.g., by tracking the locations of the customers' devices). Various location-based services may be implemented as a result of this configuration.

In one implementation of the invention, the media hub device 140 may be controlled or otherwise be configured by an offer management system. The offer management system may be coupled to the various media hubs 140 in a retail facility over a network connection, such as the local network in the retail facility, or a larger network, such as an extranet or the Internet. The offer management system may support various features of the media hubs 140, including installation and/or configuration of the media hubs 140. As an example, the offer management system may manage installation of media hubs 140 when the media hubs 140 are initially powered on or on-boarded to the local network, as previously described. As another example, the offer management system may manage configuration of one or more of the media hubs 140 when those media hubs 140 are powered-down or off-boarded from the local network.

Once configured, a media hub device 140 may be operable to perform various functions associated with a customer's activities in a retail store including, but not limited to, a customer checking out at a checkout lane in a retail store. The media hub device 140 may attempt to identify a customer in a checkout lane in a variety of ways (described in detail below). The media hub device 140 may, for instance, detect the presence of a digital device (e.g., a smartphone or other mobile device) associated with the customer.

The media hub device 140 may be used to identify customers or at least recognize a person as the same customer even if the actual customer's identity is not known. For example, if a customer has provided loyalty card information during a checkout, and the media hub device 140 identifies data associated with the customer device (e.g., a device identifier or other identifier), this data may be stored as part of a user profile in a database (along with, for example, transaction history information and other profile information) accessible by the media hub device 140. On a subsequent visit, if a media hub device 140 detects the customer device, the customer may be identified (and loyalty account data retrieved) even if the customer does not have, or does not enter, their loyalty number. In this manner, targeted offers and other customer-specific services may be provided. Similarly, payment information, user-entered identification information, and other information can be linked and stored in a user profile and used in a similar way. In some instances, even if a customer does not have a loyalty card (e.g., has not signed up for a loyalty account), a media hub device 140 may store identifying information for the customer device in association with transaction information such as purchases made. In this manner, the media hub device 140 may target media such as offers to the customer based on detection of the customer's device in subsequent visits based on purchases made while the customer's device was detected during previous visits.

According to an implementation of the invention, a media hub device 140 may passively monitor customer devices (used interchangeably herein throughout, along with singular forms, with "user devices") by scanning a wireless communication channel and obtaining device identification information transmitted by a user device that communicates the device identification information via the wireless communication channel. Such user devices may communicate their device identification information in association with discovery or local network logon processes. For example, a user device may broadcast its device identification information via a Bluetooth channel to make itself discoverable to other Bluetooth-enabled devices or may provide a wireless router with its device identification information in association with a request to connect to the router.

A media hub device 140 may identify user devices through such passive monitoring and provide targeted media to the user devices, whether through in-channel transmission (e.g., the same communication channel through which a user device was monitored such as a direct Bluetooth-based download/upload) or shifted channel transmission (e.g., a different communication channel than the channel from which the user device was monitored such as an electronic mail or user interface graphic transmitted via a wide area or public network).

The media hub device 140 may be used to identify users or at least recognize a person as the same user even if the actual user's identity is not known. For example, if a user has provided loyalty card information during a checkout, and the media hub identifies data associated with the user device (e.g., a device identifier or other identifier), this data may be stored as part of a user profile in a database (along with, for example, transaction history information and other profile information) accessible by the media hub device. On a subsequent visit, if a media hub detects the user device, the user may be identified (and loyalty account data retrieved) even if the user does not have, or does not enter, their loyalty number. In this manner, targeted offers and other user-specific services may be provided. Similarly, payment information, user-entered identification information, and other information can be linked and stored in a user profile and used in a similar way. According to an implementation of the invention, even if a user does not have a loyalty card (e.g., has not signed up for a loyalty account), a media hub may store identifying information for the user device in association with transaction information such as purchases made. In this manner, the media hub may target media such as offers to the user based on detection of the user's device in subsequent visits based on purchases made while the user's device was detected during previous visits.

Based on the discovered association between the user device and a user, the system facilitates user activity monitoring and media targeting and transmission in-store (e.g., before, during, and immediately after a transaction) and out-of-store (e.g., while online on the Internet). As such, through such passive monitoring by media hub device(s) 140, a comprehensive view of a user's online activity and offline activity (e.g., in-store shopping) may be obtained and used to target media based on the user's online and/or offline activity.

For implementations in which a media hub device 140 is deployed near or with point of sale terminals of a retail store, the media hub device 140 may be able to discern whether a user device is associated with a pending transaction that has been already initiated (e.g., at a point of sale associated with the media hub device 140), or is associated with a transaction waiting to be initiated. For example, a first user device and a second user device may be discovered by the media hub device 140 via the wireless communication channel. The first user device may be carried by a first user who is currently checking out (or is being checked out) at the point of sale terminal. The second user device may be carried by a second user who is waiting to checkout (e.g., is in line to checkout). Different targeted media may be provided depending on whether a transaction is currently pending or is waiting to be initiated. For example, at least some of the current items in the current transaction may be used to target media to a user device associated with a user who is currently being checked out.

The media hub device 140 may distinguish the two devices in various ways. For example, the media hub device 140 may distinguish the two devices based on signal strength indications. In these instances, the first user device may be closer in proximity and therefore be associated with a stronger signal strength than the second user device. As such, the media hub device 140 may determine that the second user device is carried by the second user who is waiting in line. In another example, a pending transaction may be associated with a user identification (e.g., a loyalty card, payment card, etc.). The user identification may be used to lookup device identification information associated with the user identification. As such, because the user identification is being used in the pending transaction, the media hub device 140 may determine that the first user device is associated with the user identification, which is being used in the pending transaction.

According to an implementation of the invention, the media hub device 140 is embedded with or includes a point of sale printer associated with a point of sale terminal. The media hub device 140 may determine that a transaction at the point of sale terminal is pending and transmit targeted the media to the first user device while the transaction is pending. In this manner, a user may receive targeted media while waiting for the transaction to be complete.

According to an implementation of the invention, the media hub device 140 may determine that the transaction is complete. For example, the media hub device 140 may receive an end of transaction signal from the point of sale terminal and/or may receive an instruction to begin printing a physical receipt. In response, the media hub device 140 may print a physical receipt that documents the transaction. Alternatively or additionally, the media hub device 140 may transmit an electronic receipt to the first user device. According to an implementation of the invention, the media hub device 140 may identify targeted media after the transaction is complete. For example, the targeted media may be identified based on items associated with the transaction and/or other user behavior. The media hub device 140 may transmit such targeted media upon completion of the transaction. The media hub device 140 may transmit such targeted media upon embedded or in association with an electronic receipt that documents the transaction. According to an implementation of the invention, the media hub device 140 may print (e.g., on a physical receipt) the targeted media, which may be formatted appropriately for printing.

According to an implementation of the invention, the media hub device 140 may store the transaction information in association with identification information that identifies the first user device. In this manner, purchase activity associated with the first user device may be stored for later retrieval (and subsequent targeting).

According to an implementation of the invention, the media hub device 140 may determine whether or not identification information that identifies a monitored user device is associated with a customer identification (such as a loyalty identifier, credit card number, etc.). If so, the media hub device 140 may target media based on customer behavior information known about the user identified by the customer identification. If not, the media hub device 140 may attempt to identify the customer associated with (e.g., carries) the user device based on techniques described herein.

According to an implementation of the invention, whether or not the user has accepted an invitation to install a client application, the media hub device 140 may store the transaction information relating to the pending transaction in association with the device identification information of the monitored device. In this manner, customer behavior for users who do not download the client application may still be monitored based on passively monitored device identification information (assuming the customer carries the associated user device when the user is at the deployed location).

According to an implementation of the invention, the media hub device 140 may obtain a customer identification. For example, the customer identification may be scanned or otherwise read at a point of sale terminal, to which the media hub device 140 is communicably coupled (via wired or wireless connection). The media hub device 140 may store the customer identification in association with the device identification information. In this manner, an identity of a user may be determined during subsequent visits based on a passively monitored device identification information (again, assuming the customer carries the associated user device when the user is at the deployed location). Accordingly, a user may be deemed to be located within the deployed location even if the user has not yet provided a customer identification or other means of identification.

According to an implementation of the invention, the association between the user device and the customer identification may be transmitted to an offer management system. The offer management system may monitor a user's online activity using the user device (e.g., activity while not at the deployed location such as making online purchases or Internet histories), and may store such online activity in association with the customer identification. The customer identification may be anonymized as appropriate to protect any personally identifying information (to the extent required and/or to the extent that the user has not opted-in for the system to use such information). In this manner, both online and offline activity of a user may be monitored by the system based on passively monitored user devices by media hub device(s) 140 deployed at particular locations. It should be noted that the various targeted media described herein may be identified based on online activity (as used herein, the term "activity" may be used interchangeably throughout with "behavior") and/or offline activity. Furthermore, such targeted media may be provided to the user while the user is waiting in line at a point of sale for a transaction to be initiated, during the transaction, upon completion of the transaction, while the user is online, or while the user is not at the deployed location.

According to an implementation of the invention, the media hub device 140 may determine whether a customer has already downloaded a client application such as a predetermined mobile application (e.g., a loyalty application associated with the retailer or other entity, or other application). If it is determined that a customer has not already downloaded a predetermined mobile application, the media hub device 140 may incent or otherwise prompt the customer to download the application. As a non-limiting example, the media hub device 140 may be in operative communication with an in-lane printer so as to cause the in-lane printer to print a message on a POS receipt at the conclusion of a transaction. The message may include a QR code or other message to prompt the customer to perform the download. An incentive may also be provided to the customer as desired. Optionally, upon download of the mobile application, the customer may be prompted to enter customer identification information (e.g., loyalty card information, mobile number, device identifier and/or other customer identification information). A user profile may be updated upon detection that the user has downloaded the mobile application. This status indicator may be used during subsequent visits to enable the media hub device 140 to communicate directly with the known customer's mobile device as described herein. By way of example, the media hub device 140 may be used to detect the presence of the customer device and read user or device identification data (or other identifier) and compare it with previously stored information to identify the customer and/or customer-related information.

Additionally, the media hub device 140 may be used to transmit offers directly to a customer device. This action may be occur in lieu of (or in addition to) printing offers on a receipt. The media hub device 140 may be configured to make and deliver offer determinations in-lane at the time of checkout. This is a significant advantage over many systems where offers are created and managed at a remote offer management system (often under control of a third party), or by an in-store server located remote from the checkout lanes. The media hub device 140 may access and/or receive data from the POS terminal (e.g., to obtain real-time data regarding items that a customer is purchasing). The media hub device 140 may also receive information from a remote offer management system (in batch and/or real-time), and/or an in-store server. This information may be used to generate real-time, targeted offers, which can be delivered to the customer via a printed receipt, via direct communication to the customer device, or both.

In the non-limiting depiction of FIG. 3, the media hub device 140 includes a configuration engine 306, a location management engine 310, a network interface engine 315, a print management engine 320, a targeted offer management engine 325, a configuration data datastore 330, a customer behavior datastore 335, and a local offer datastore 340.

The configuration engine 305 may be configured to support installation and/or configuration of the media hub device 140. In some implementations, the configuration engine 305 supports interfaces with the administrator device 145 and/or the offer management system 160. The configuration engine 305 may support installation processes that load configuration data from the offer management system 160 or other source of configuration data (e.g., a peer media hub, as described herein) into the configuration data datastore 330.

The configuration data may include, without limitation, a location within a retail store at which a media hub to which the configuration data relates is deployed (e.g., a lane number when the media hub is configured as a printer or other device at a point of sale, an aisle number or department name when the media hub is configured as a kiosk or other device at various locations in a retail store, etc.), a network address (e.g., a URL or IP address) or identifier of offer management system 160 or other source of configuration data, one or more targeting rules for identifying media such as targeted offers to provide to customers, various threshold and default values described herein, one or more peer rules described herein, a communication interval that specifies when the media hub should contact offer management system 160 or other remote device for updates to configuration or other data (for instances when such updates are to be pulled by a media hub), a retailer name or store at which the media hub is deployed, an alert contact at which to provide alerts described herein, printer configuration settings for implementations in which a media hub is embedded within or operates in association with a printer device (e.g., retail store information to be print such as hours and address, receipt or other print formatting such as text fonts, text sizes, graphics, etc.), and/or other data used by the media hub for initial configuration, updates, and/or operation.

The configuration engine 305 may also load targeted offer data from the offer management system 160 into the local offer datastore 340. In various implementations, the configuration engine 305 receives instructions from the offer management system 160 to configure the media hub device 140 as part of a logical group of media hubs. The configuration engine 305 may appropriately configure the media hub device 140 in response to such instructions.

In some implementations, the configuration engine 305 may maintain a list of peer media hub(s) 140. A media hub may be a "peer" of another media hub when both media hubs are within the same logical grouping of media hubs, are part of a network of devices that communicate via short-range (e.g., generally less than 100 meter range, such as the Bluetooth protocol) wireless communication, are part of a network of devices (e.g., a local area network of a retail store at which the media hubs are deployed) that are connected together via a network switch and/or communicate with each other via a network router device, and/or are otherwise expressly designated as peers. Generally, although not necessarily, peer media hubs are each deployed within a retail store.

Configuration engine 305 may obtain the list of peer media hubs in various ways. For example, upon initial configuration of a media hub device 140, configuration engine 305 may obtain a listing of other media hubs to be deployed at a given retail store from offer management system 160 or administrator device 145. These media hubs may be stored as peer media hubs. In another example, upon initial configuration of a media hub device 140, the media hub may enter an initialization phase (the duration of which may be predefined in its configuration data) during which nearby media hubs are discovered and automatically stored as a peer media hub. Peer media hubs may be discovered by sending, via the network that connects the peers, a peer identification request, to which peer media hubs respond with their identification, configuration data, and/or other information. In some instances, peer media hubs may be discovered based on media hubs that are connected to a network (e.g., devices connected through a router or access point having identifiers or other information that indicates that the devices are media hubs).

Regardless of the manner in which a list of peer media hubs is obtained, in some instances, configuration engine 305 may store, in configuration data datastore 330, configuration data for each peer media hub. In these instances, each media hub may store the configuration data for itself and configuration data for each of its peer media hubs. Configuration engine 305 may use the configuration data for a given peer media hub to configure a new media hub using the configuration data for the replaced media hub. In this manner, the configuration engine 305 of a given media hub device 140 may, in effect, replace a peer media hub device 140 with a newly discovered media hub.

In some instances, to prevent multiple media hubs in the group from configuring the new media hub, each media hub (e.g., via its configuration engine 305) may configure other media hubs in accordance with a peer configuration rule or trigger (e.g., a rule that assigns peer(s) to a media hub with which the media hub is responsible to configure, a first-to-detect rule in which a media hub that first detects that a replacement should occur is responsible for configuring the new media hub, an explicit indication from an administrator for one media hub to configure another media hub, etc.).

In other instances, multiple media hubs may automatically configure a newly detected media hub in a cooperative, centralized or decentralized peer-to-peer, fashion. In these instances, the new media hub may obtain various portions of its configuration data from multiple peer media hubs. For example, a first portion of the configuration data may be obtained from a first peer media hub and a second portion of the configuration data may be obtained from a second peer media hub. The new media hub may then generate the full configuration data based on the first and second portions. Of course, the foregoing requires that the first and second peer media hubs each have a copy (or at least portions) of the same configuration data intended for the new media hub. In the peer-to-peer model, a given media hub may provide at least a portion of the configuration data (e.g., the configuration data of a media hub to be replaced) to the new media hub.

In this manner, when a media hub is placed offline (whether intentionally for service or unintentionally due to failure), a replacement media hub need only be powered on and connected to the network of media hubs to obtain configuration data for the media hub that is taken offline. As such, the replace media hub may have be configured in the same manner as the media hub that is offline (e.g., may be configured with the same lane or other location information), and may resume operations of that media hub.

The location management engine 310 may be configured to track locations of customer devices in the facility 170. In various implementations, the location management engine 310 may include BLE hardware and/or software and/or GPS hardware and/or software in order to identify positions of customer devices. The BLE hardware may be implemented as a BLE beacon that identifies locations of a customer device based on signal properties (Received Signal Strength Indicator (RSSI), etc.) of signals between the customer device and the BLE beacon, or other techniques. In various implementations, the location management engine 310 updates customer behavior data based on identified locations of customer devices.

The network interface engine 315 may be configured to send data to and receive data from the computer network 150. In some implementations, the network interface engine 315 is implemented as a wireless network card that supports a wireless network connection to the computer network 150. Examples of wireless network cards include wireless network cards compatible with 802.11 protocols, 802.16 protocols, and compatible with cellular data (e.g., Third Generation (3G), Fourth Generation (4G), etc.) protocols.

The print management engine 320 may be configured to manage printing hardware on the media hub device 140. The print management engine 320 may include drivers, system-level processes, etc. to instruct printing hardware to print items. In various implementations, the print management engine 320 instructs printing hardware to print barcodes, QR codes, or other items that direct customers to a website or application store location that allows installation of a mobile application on a customer device.

The targeted offer management engine 325 may select and/or provide targeted offers to customers based on customer behavior data. The targeted offer management engine 325 may identify a customer using customer background data. In some implementations, for instance, the targeted offer management engine 325 may call processes supported by the customer identification management engine 215 in the offer management system 160 in order to identify a specific customer based on the specific customer's association with known customer devices. The targeted offer management engine 325 may further gather other data, including data about a customer's specific background and/or past purchases. The targeted offer management engine 325 may also gather information related to the customer's location, such as information obtained by the location management engine 310, discussed further herein. Using this exemplary information, the targeted offer management engine 325 may select targeted offers for the customers. In various implementations, the targeted offer management engine 325 provides the targeted offers to a mobile application in customer devices associated with the specific customer.

The configuration data datastore 330 may store configuration data related to the media hub device 140. In specific implementations, the configuration data datastore 330 stores one or more of: the location the media hub device 140 has been installed inside the facility 170, any identifiers of point of sale terminal(s) 135 associated with the media hub device 140, and network access parameters (e.g., wireless network authentication parameters, etc.) of the media hub device 140. The configuration data datastore 330 may further store identifiers related to any logical groups the media hub device 140 belongs to or has belonged to. In some implementations, the configuration data datastore 330 is updated by the offer management system 160 as updated configurations are available to the offer management system 160.

The customer behavior datastore 335 may store customer behavior data related to the behavior of specific customers. Customer behavior data may include information related to customers' identities, backgrounds, past purchases, locations, and specific customer devices associated with known customers. As discussed herein, the customer behavior data may assist in selecting targeted offers for specific customers.

The local offer datastore 340 may store targeted offer data related to targeted offers that may be targeted to customers in the facility 170. In various implementations, the targeted offer data is indexed by parameters related to customer behavior data. For example, each item of targeted offer data in the local offer datastore 340 may be indexed by specific backgrounds, past purchases, locations, and/or customer devices that may apply to the targeted offer.

The structures in the media hub device 140 may operate to provide targeted offers to the first customer device(s) 125 and/or the second customer device(s) 130 based on customer behavior data and locations of the customer devices as follows. In various implementations, the location management engine 310 operates to identify locations of the first customer device(s) 125 and/or the second customer device(s) 130 in the facility 170. More specifically, the location management engine 310 may send a location signal to the first customer device(s) 125 and/or the second customer device(s) 130 as the first customer device(s) 125 and/or the second customer device(s) 130 enter the facility 170. The location signal may comprise a BLE signal from hardware managed by the location management engine 310. Locational hardware on the first customer device(s) 125 and/or the second customer device(s) 130 may respond to the location signal by providing a location response signal that contains therein relevant locations of the customer devices.

In various implementations, the targeted offer management engine 325 may identify whether the first customer device(s) 125 and/or the second customer device(s) 130 correspond to known or unknown customers. In an example, the first customer device(s) 125 may belong to an unknown customer, while the second customer device(s) 130 may belong to a known customer. In such an example, the targeted offer management engine 325 may direct the print management engine 320 to print a barcode, QR code, etc. The barcode, QR code, etc. may allow the first customer 105 to download a mobile application that receives targeted offers. In this example, the targeted offer management engine 325 may identify customer behavior data related to the second customer 110 (either by direct lookup in the customer behavior datastore 335 or by gathering customer behavior data from the offer management system 160).

The targeted offer management engine 325 may further select targeted offers for the second customer 110 based on customer behavior data and based on targeted offer data in the local offer datastore 340. The targeted offers may be customized based on past purchases, locations, etc. of the second customer 110. In some implementations, the targeted offer management engine 325 identifies a channel of items the second customer 110 has recently purchased or is about to purchase. The targeted offer management engine 325 may provide targeted offers to the identified channel if the identified channel is deemed an appropriate marketing channel, or may provide targeted offers to different channels if the identified channel is deemed an inappropriate marketing channel. In various implementations, the targeted offer management engine 325 provides the targeted offers to a mobile application on the second customer device 130, either over the computer network 150 or by instructions to the offer management system 160.

Media Hub Installation

Figure 4A:
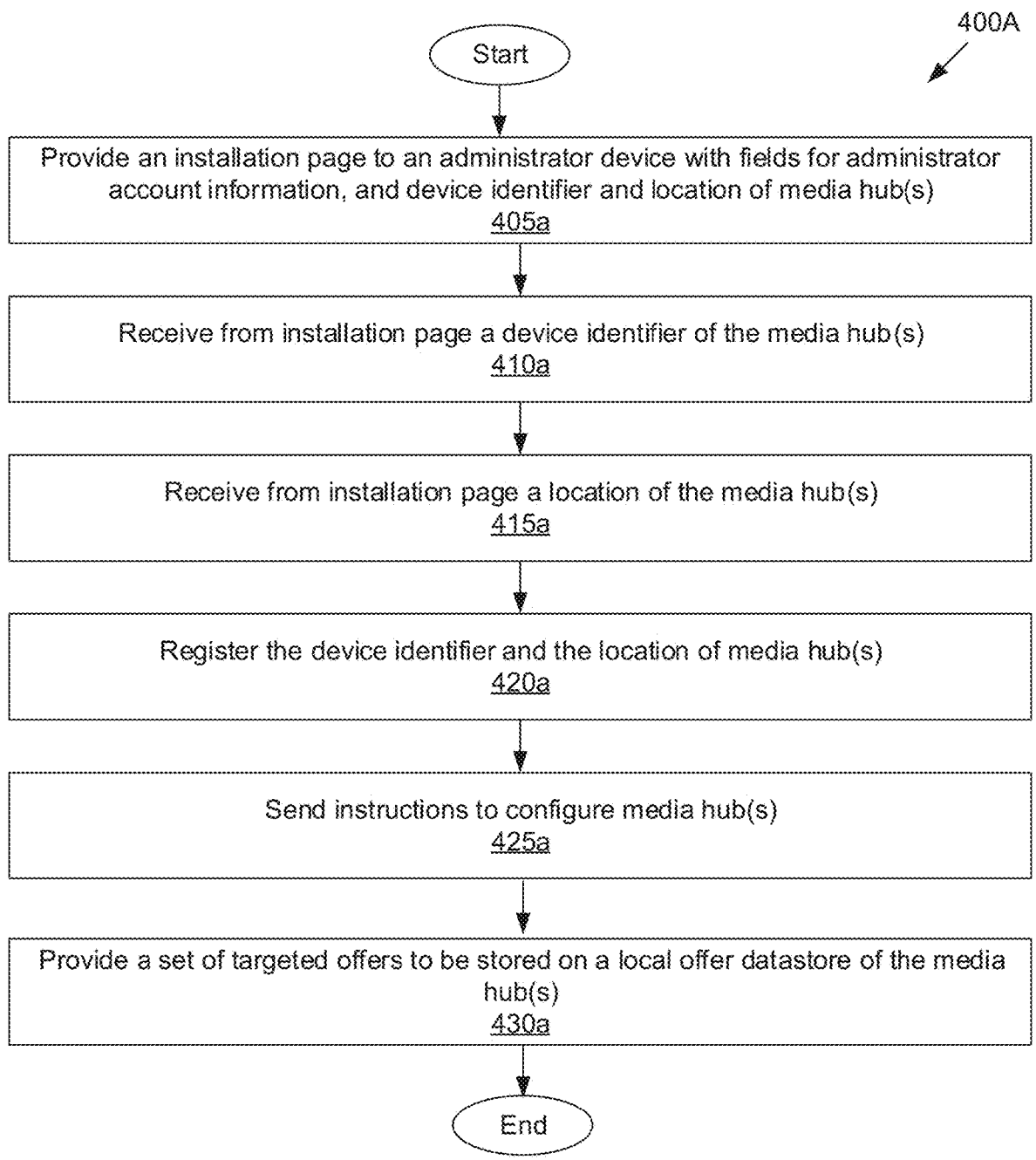
FIG. 4A depicts an exemplary flowchart of processing operations for installing a media hub, according to an implementation of the invention.

FIG. 4A depicts an exemplary flowchart of processing operations 400A for installing a media hub, according to an implementation of the invention. The various processing operations and/or data flows depicted in FIG. 4A may be accomplished using some or all of the system components (e.g., the offer management system 160 and/or the media hub(s) 140, etc.) described in detail above and, in some implementations, various operations may be performed in different sequences and various operations may be omitted. Additional operations may be performed along with some or all of the operations shown in the depicted flow diagram. One or more operations may be performed simultaneously. Accordingly, the operations as illustrated (and described in greater detail below) are exemplary by nature and, as such, should not be viewed as limiting.

At operation 405a, the installation management engine 205 provides an installation page to the administrator device 145 with one or more fields, such as fields for administrator account information, device identifier information related to the media hub(s) 140, and/or locations of the media hub(s) 140. The administrator device 145 may be provided the installation page when the administrator 120 initially connects one of the media hub(s) 140 (e.g., when the administrator 120 initially unpackages one of the media hub(s) 140 and connects it to the computer network 150). At such a point, the administrator 120 may be directed to a website managed by the installation management engine 205.

At operation 410a, the installation management engine 205 receives from the installation page a device identifier of the media hub(s) 140. More specifically, the installation management engine 205 may receive, e.g., a MAC address or other unique device identifier of the media hub(s) 140. The MAC address or other unique device identifier may have been provided by the administrator 120 in the installation page or may have been inferred from other information (e.g., inferred from information on the packaging of the media hub(s) 140).

At operation 415a, the installation management engine 205 receives from the installation page a location of the media hub(s). The location may correspond to a specified location in the facility 170. As an example, the location may correspond to a specific instance of the point of sale terminal(s) 135. The location may have other attributes, such as GPS coordinates, coordinates relevant to WiFi triangulation, etc.

At operation 420a, the installation management engine 205 registers the device identifier and location of the media hub(s) 140. More specifically, the installation management engine 205 may save the device identifier and the location of the media hub(s) 140 in the configuration data datastore 330. The installation management engine 205 may also save other information in the configuration data datastore 330, such as specific point of sale terminal(s) 135 with which the media hub(s) 140 is to be associated.

At operation 425a, the installation management engine 205 sends instructions to configure the media hub(s) 140. The installation management engine 205 may provide, over the computer network 150, instructions to the media hub(s) 140 to interoperate with relevant point of sale terminal(s) 135, and to track locations of customer device(s) in the facility 170. In various implementations, the installation management engine 205 couples the media hub(s) 140 to relevant point of sale terminal(s) 135.

At operation 430a, the installation management engine 205 provides a set of targeted offers to be stored on a local offer datastore of the media hub(s). More specifically, the installation management engine 205 may select sets of targeted offers from targeted offer data in the remote offer datastore 235. The installation management engine 205 may further provide the sets of targeted offers over the computer network 150 to the media hub(s) 140. In various implementations, the media hub(s) 140 store the sets of targeted offers locally in the local offer datastore 340. In other implementations, the media hub(s) 140 may receive targeted offers from offer management system 60 in real-time during a customer transaction.

Figure 4B:
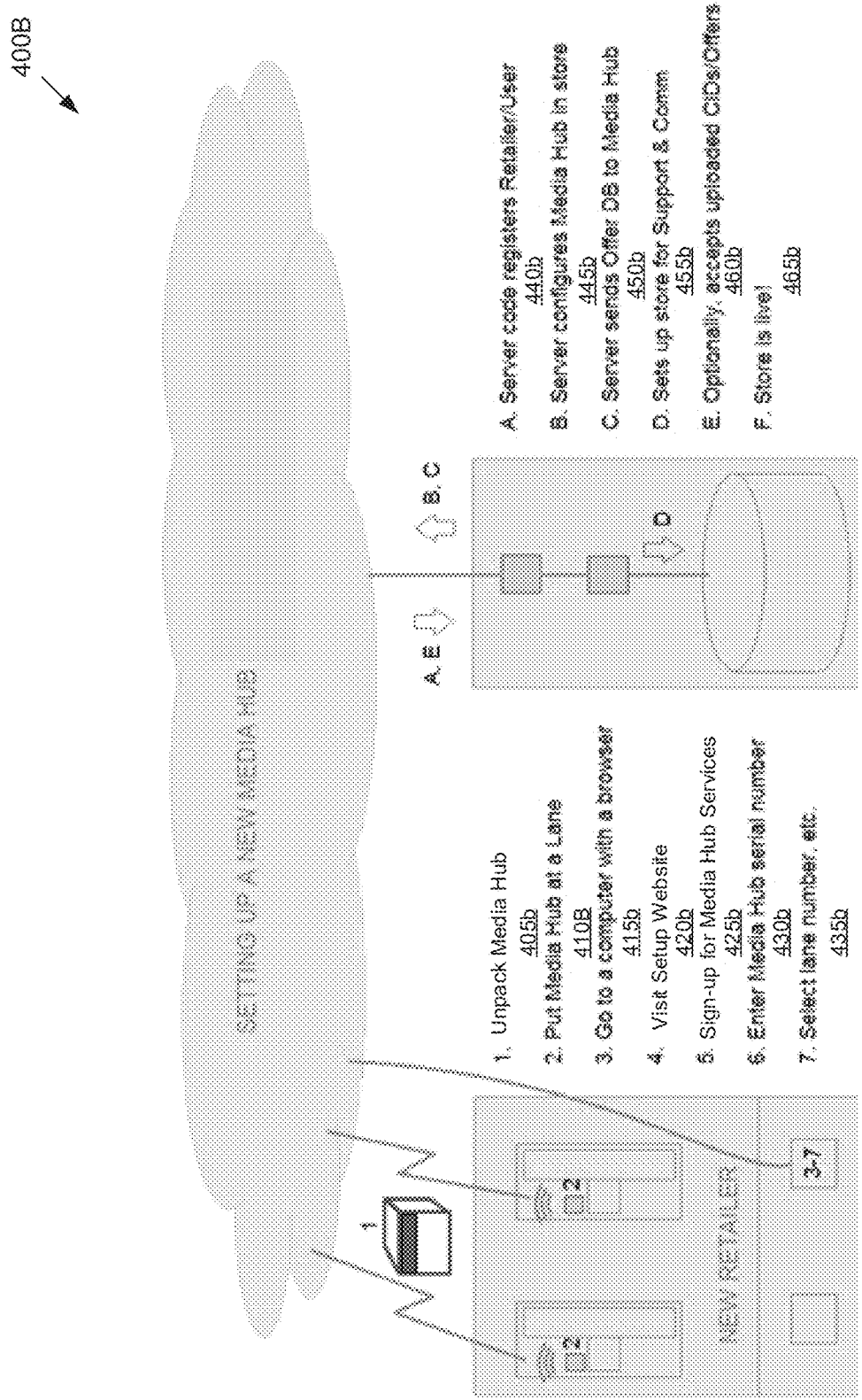
FIG. 4B is an exemplary depiction of a process of installing a media hub, according to an implementation of the invention.

FIG. 4B is an exemplary depiction of a process 400B of installing a media hub, according to an implementation of the invention. Elements 405b-435b identify operations that may be taken in or near the facility 170. The process 400B may begin at operation 405b, where the administrator 120 unpacks the media hub(s) 140. At operation 410b, the administrator 120 may place the media hub(s) 140 in a specified location in the facility 170 (e.g., in a lane near the point of sale terminal(s) 135). At operation 415b, the administrator 120 accesses the administrator device 135. At operation 420b, the administrator 120 directs a web browser on the administrator device 145 to a setup website, such as a website maintained by the offer management system 160. At operation 425b, the offer management system 160 allows the administrator 120 to sign the media hub(s) 140 for services that allow the offer management system 160 to manage the media hub(s) 140. At operation 430b, the administrator 120 enters device identification information for the media hub(s) 140 into the web browser so that the offer management system 160 can register the media hub(s) 140 into relevant databases. At operation 435b, the administrator 120 selects other identifying information (lane number, etc.) related to the media hub(s) 140.

Elements 440b-465b identify operations that may be taken by the offer management system 160. At operation 440b, the offer management system 160 registers the retailer/user associated with the facility 170. At operation 445b, the offer management system 160 configures the media hub(s) 140 using the techniques described herein. At operation 450b, the offer management system 160 sends targeted offer data from the remote offer datastore 235 to the media hub(s) 140 so that the local offer datastore 340 can be installed on the media hub(s) 140. At operation 455b, the offer management system 160 sets up the facility 170 for support and future communications. At operation 460b, the offer management system 160 may accept Card Identification Numbers (CID)/offers, etc. from the media hub(s) 140. At operation 465b, the offer management system 160 provides a notification that the media hub(s) 140 are live and able to provide targeted offers to customers.

Recovering from Failed Media Hub(s)

Figure 5:
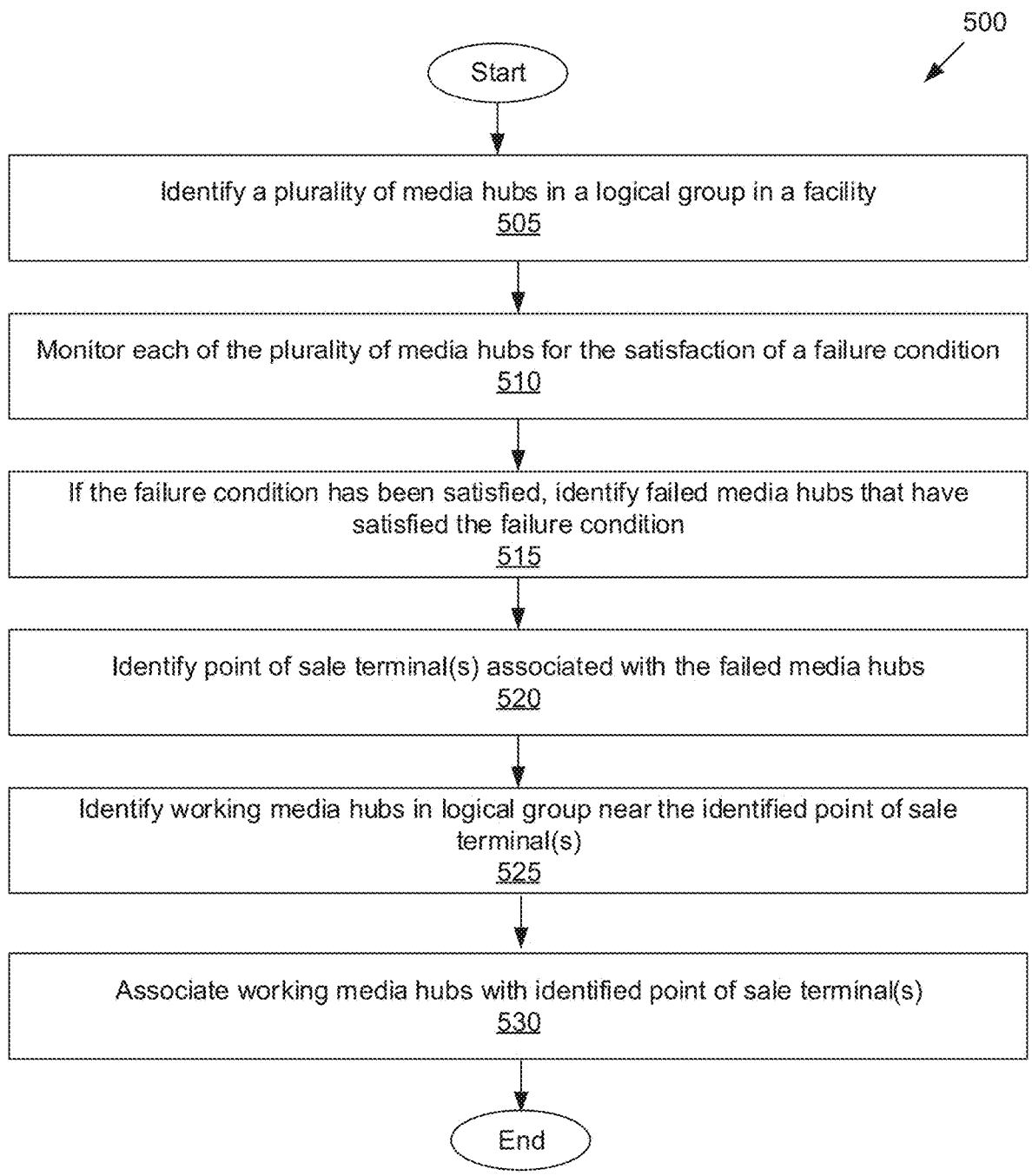
FIG. 5 depicts an exemplary flowchart of processing operations for recovery from a failed media hub, according to an implementation of the invention.

FIG. 5 depicts an exemplary flowchart of processing operations 500 for recovery from a failed media hub, according to an implementation of the invention. The various processing operations and/or data flows depicted in FIG. 5 may be accomplished using some or all of the system components (e.g., the offer management system 160 and/or the media hub(s) 140, etc.) described in detail above and, in some implementations, various operations may be performed in different sequences and various operations may be omitted. Additional operations may be performed along with some or all of the operations shown in the depicted flow diagram. One or more operations may be performed simultaneously. Accordingly, the operations as illustrated (and described in greater detail below) are exemplary by nature and, as such, should not be viewed as limiting.

At operation 505, the offer device configuration engine 210 identifies a plurality of the media hubs 140 in a logical group in the facility 170. At operation 510, the offer device configuration engine 210 monitors each of the plurality of media hubs for the satisfaction of a failure condition. At operation 515, if the failure condition has been satisfied the offer device configuration engine 210 identifies failed media hubs that have satisfied the failure condition. At operation 520, the offer device configuration engine 210 identifies point of sale terminal(s) associated with the failed media hubs. At operation 525, the offer device configuration engine 210 identifies working media hubs in logical group near the identified point of sale terminal(s). At operation 530, the offer device configuration engine 210 associates working media hubs with identified point of sale terminal(s).

Customer Identification

Figure 6:
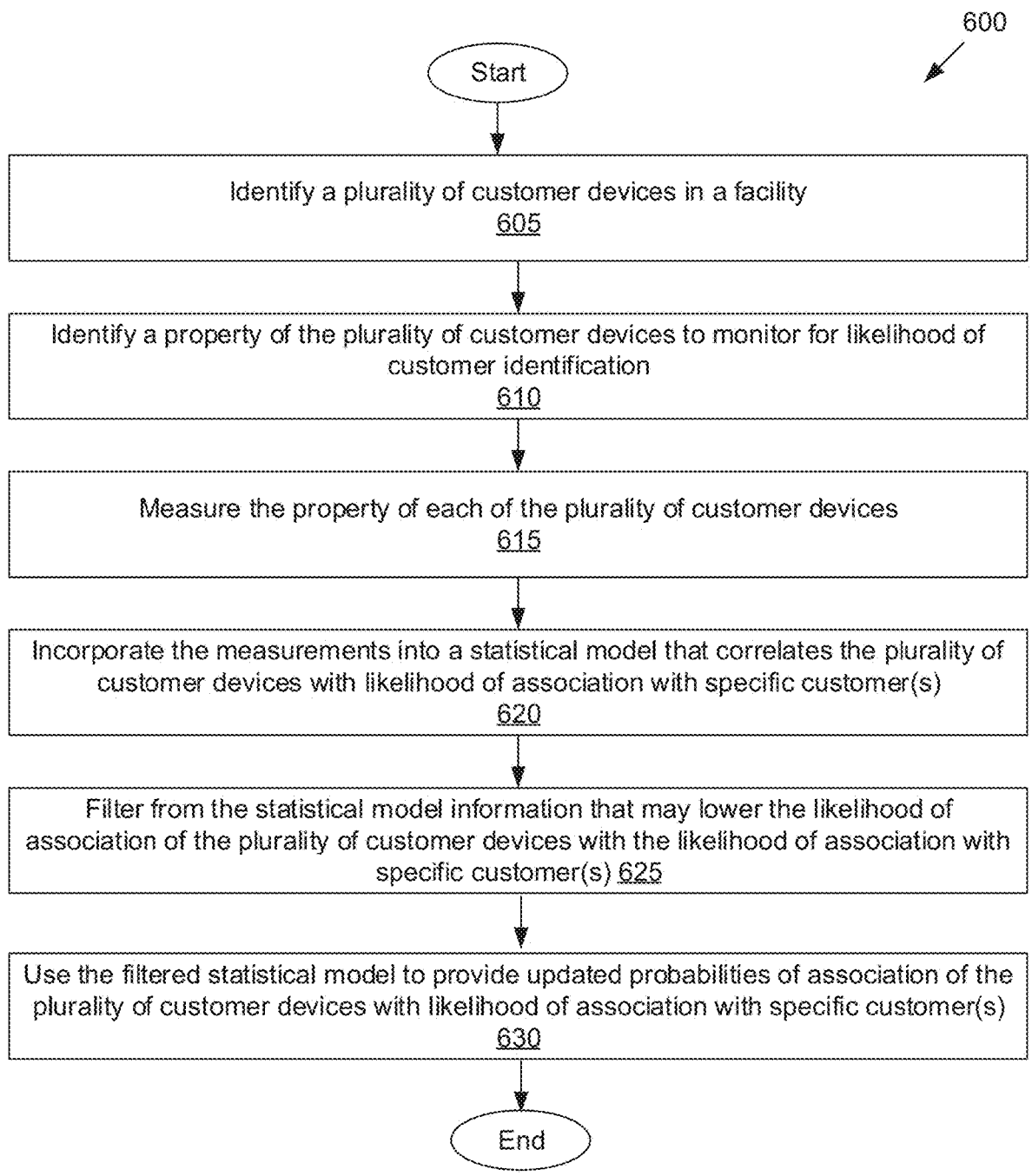
FIG. 6 depicts an exemplary flowchart of processing operations for identifying a customer through analysis of data from a plurality of customer devices, according to an implementation of the invention.

FIG. 6 depicts an exemplary flowchart of processing operations 600 for identifying a customer through analysis of data from a plurality of customer devices, according to an implementation of the invention. The various processing operations and/or data flows depicted in FIG. 6 may be accomplished using some or all of the system components (e.g., the offer management system 160 and/or the media hub(s) 140, etc.) described in detail above and, in some implementations, various operations may be performed in different sequences and various operations may be omitted. Additional operations may be performed along with some or all of the operations shown in the depicted flow diagram. One or more operations may be performed simultaneously. Accordingly, the operations as illustrated (and described in greater detail below) are exemplary by nature and, as such, should not be viewed as limiting.

At operation 605, the customer identification management engine 215 identifies a plurality of customer devices in a facility. At operation 610, the customer identification management engine 215 identifies a property of the plurality of customer devices to monitor for likelihood of customer identification. At operation 615, the customer identification management engine 215 measures the property of each of the plurality of customer devices. At operation 620, the customer identification management engine 215 incorporates the measurements into a statistical model that correlates the plurality of customer devices with likelihood of association with specific customer(s). At operation 625, the customer identification management engine 215 filters from the statistical model information that may lower the likelihood of association of the plurality of customer devices with the likelihood of association with specific customer(s). At operation 630, the customer identification management engine 215 uses the filtered statistical model to provide updated probabilities of association of the plurality of customer devices with likelihood of association with specific customer(s).

Providing Mobile Offers

Figure 7:
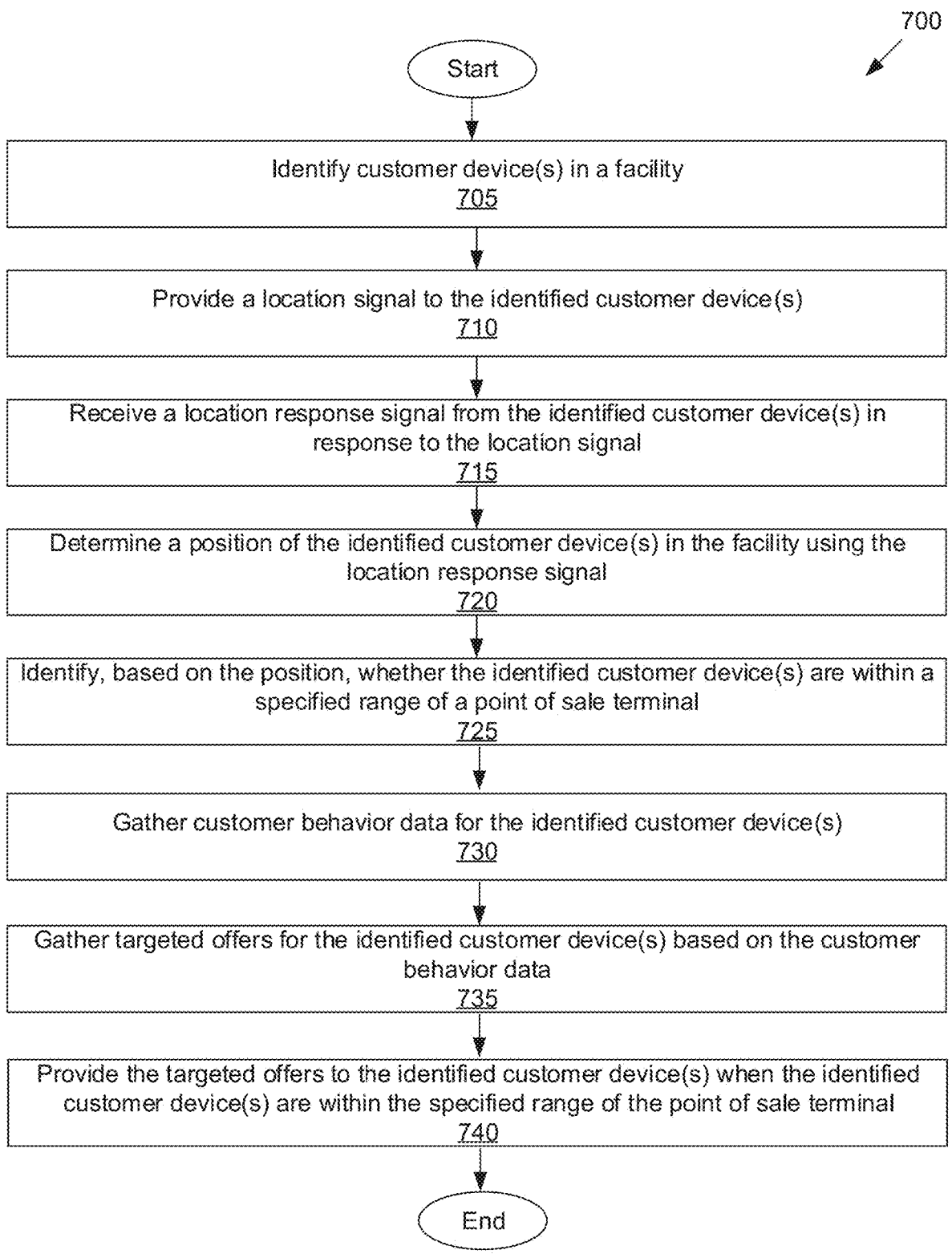
FIG. 7 depicts an exemplary flowchart of processing operations for providing offers to a mobile application on a customer device based on proximity to a media hub and customer behavior, according to an implementation of the invention.

FIG. 7 depicts an exemplary flowchart of processing operations 700 for providing offers to a mobile application on a customer device based on proximity to a media hub and customer behavior, according to an implementation of the invention. The various processing operations and/or data flows depicted in FIG. 7 may be accomplished using some or all of the system components (e.g., the offer management system 160 and/or the media hub(s) 140, etc.) described in detail above and, in some implementations, various operations may be performed in different sequences and various operations may be omitted. Additional operations may be performed along with some or all of the operations shown in the depicted flow diagram. One or more operations may be performed simultaneously. Accordingly, the operations as illustrated (and described in greater detail below) are exemplary by nature and, as such, should not be viewed as limiting.

At operation 705, the location management engine 310 identifies customer device(s) in a facility. At operation 710, the location management engine 310 provides a location signal to the identified customer device(s). At operation 715, the location management engine 310 receives a location response signal from the identified customer device(s) in response to the location signal. At operation 720, the location management engine 310 determines a position of the identified customer device(s) in the facility using the location response signal. At operation 725, the location management engine 310 identifies, based on the position, whether the identified customer device(s) are within a specified range of a point of sale terminal. At operation 730, the targeted offer management engine 325 gathers customer behavior data from the local offer datastore 340 for the identified customer device(s). At operation 735, the targeted offer management engine 325 gathers targeted offers for the identified customer device(s) based on the customer behavior data. At operation 740, the targeted offer management engine 325 provides the targeted offers to the identified customer device(s) when the identified customer device(s) are within the specified range of the point of sale terminal.

Directing Customers to Marketing Channels

Figure 8:
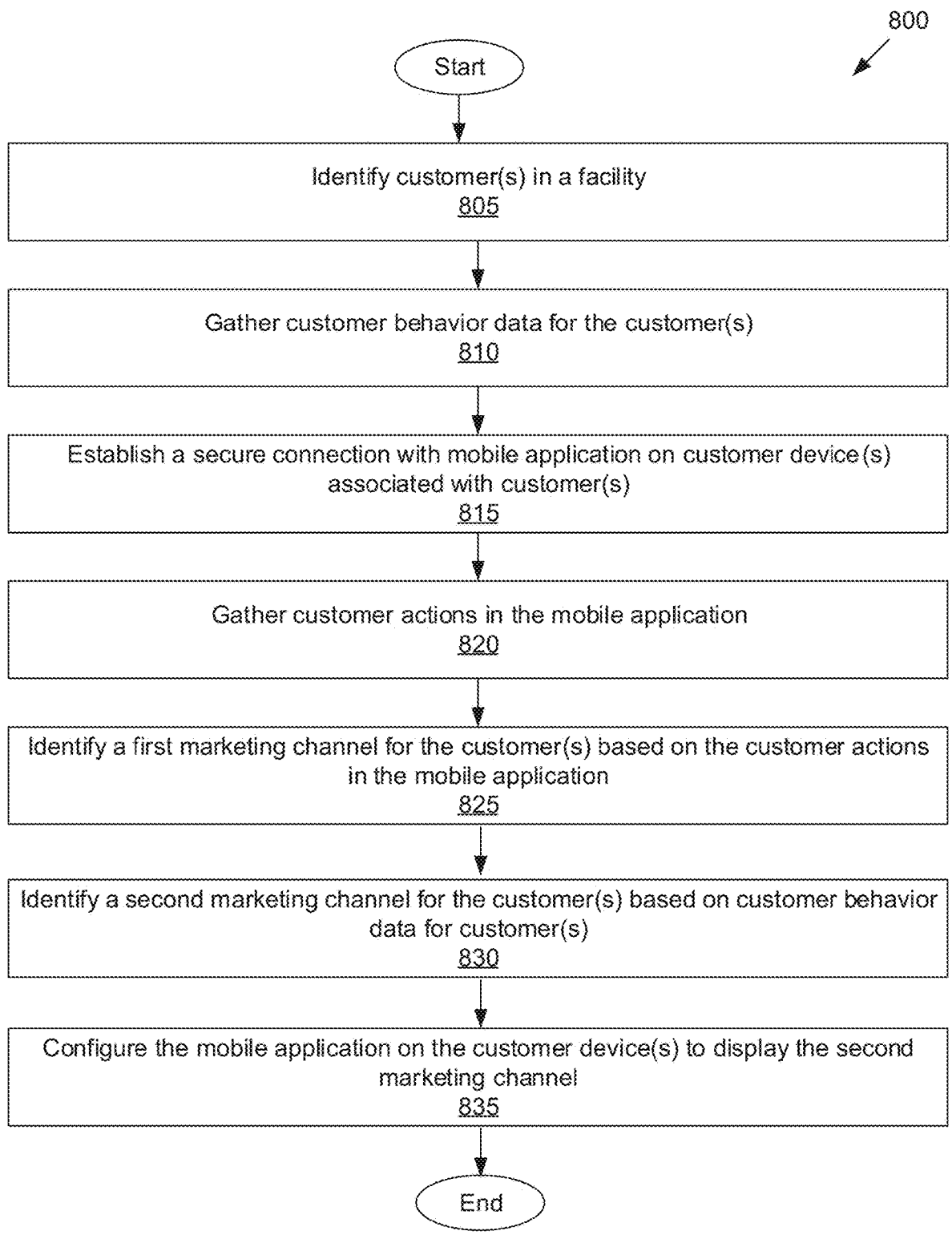
FIG. 8 depicts an exemplary flowchart of processing operations for directing customers to a specific marketing channel based on customer behavior, according to an implementation of the invention.

FIG. 8 depicts an exemplary flowchart of processing operations 800 for directing customers to a specific marketing channel based on customer behavior, according to an implementation of the invention. The various processing operations and/or data flows depicted in FIG. 8 may be accomplished using some or all of the system components (e.g., the offer management system 160 and/or the media hub(s) 140, etc.) described in detail above and, in some implementations, various operations may be performed in different sequences and various operations may be omitted. Additional operations may be performed along with some or all of the operations shown in the depicted flow diagram. One or more operations may be performed simultaneously. Accordingly, the operations as illustrated (and described in greater detail below) are exemplary by nature and, as such, should not be viewed as limiting.

At operation 805, the customer identification management engine 215 identifies customer(s) in a facility. At operation 810, the targeted offer management engine 325 gathers customer behavior data for the customer(s). At operation 815, the mobile application management engine 220 establishes a secure connection with mobile application on customer device(s) associated with customer(s). At operation 820, the mobile application management engine 220 gathers customer actions in the mobile application. At operation 825, the targeted offer management engine 325 identifies a first marketing channel for the customer(s) based on the customer actions in the mobile application. At operation 830, the targeted offer management engine 325 identifies a second marketing channel for the customer(s) based on customer behavior data for customer(s). At operation 835, the mobile application management engine 220 configures the mobile application on the customer device(s) to display the second marketing channel.

Purchase Data

Figure 9A:
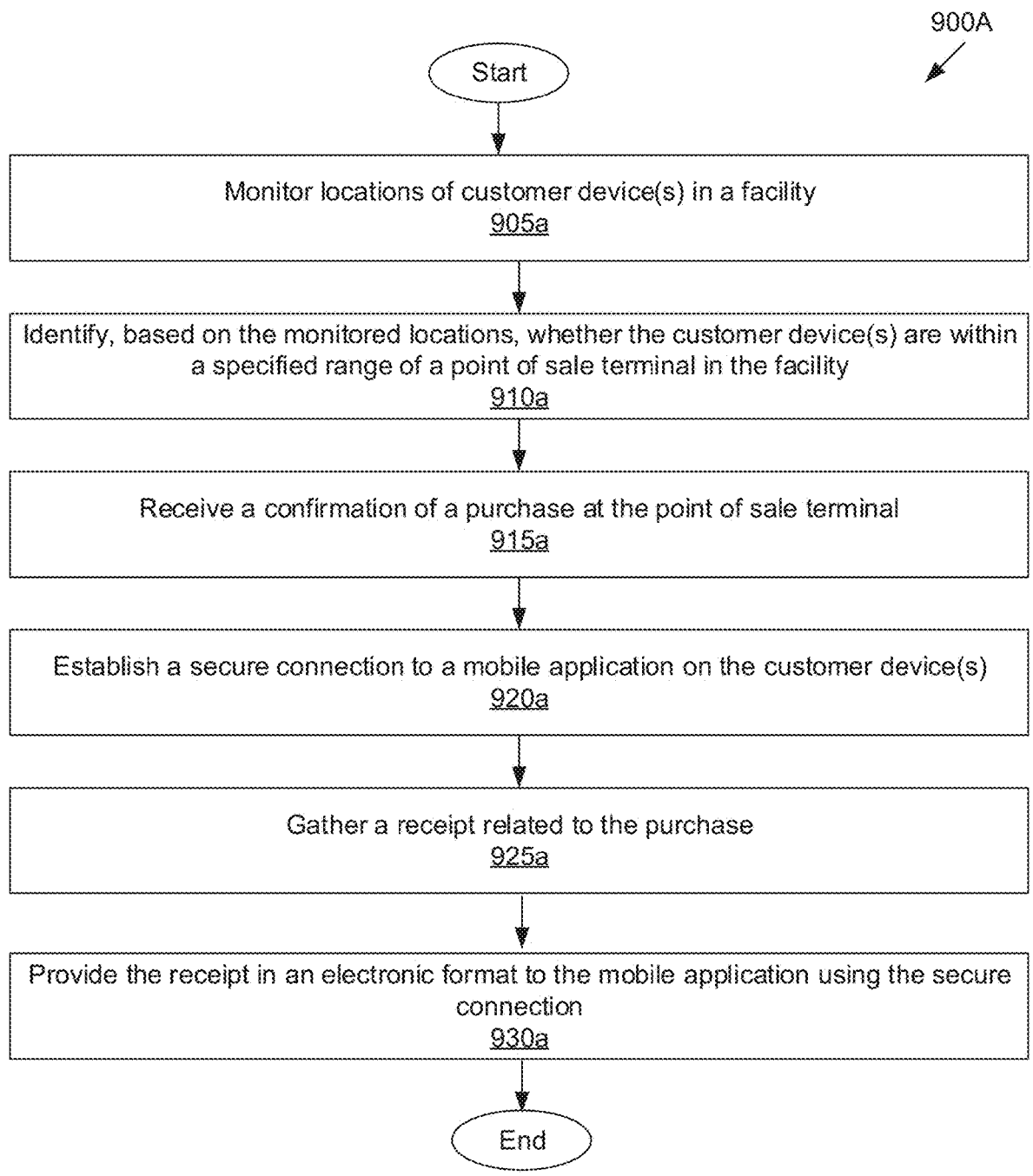
FIG. 9A depicts an exemplary flowchart of processing operations for providing purchase data to a secure mobile application on a customer device proximate to a media hub, according to an implementation of the invention.

FIG. 9A depicts an exemplary flowchart of processing operations 900A for providing purchase data to a secure mobile application on a customer device proximate to a media hub, according to an implementation of the invention. The various processing operations and/or data flows depicted in FIG. 9A may be accomplished using some or all of the system components (e.g., the offer management system 160 and/or the media hub(s) 140, etc.) described in detail above and, in some implementations, various operations may be performed in different sequences and various operations may be omitted. Additional operations may be performed along with some or all of the operations shown in the depicted flow diagram. One or more operations may be performed simultaneously. Accordingly, the operations as illustrated (and described in greater detail below) are exemplary by nature and, as such, should not be viewed as limiting.

At operation 905a, the location management engine 310 monitors locations of customer device(s) in a facility. At operation 910a, the location management engine 310 identifies, based on the monitored locations, whether the customer device(s) are within a specified range of a point of sale terminal in the facility. At operation 915a, the targeted offer management engine 325 receives a confirmation of a purchase at the point of sale terminal. At operation 920a, the mobile application management engine 220 establishes a secure connection to a mobile application on the customer device(s). At operation 925a, the targeted offer management engine 325 gathers a receipt related to the purchase. At operation 930a, the mobile application management engine 220 provides the receipt in an electronic format to the mobile application using the secure connection.

Providing Offers

FIG. 9B is an exemplary depiction of a process of providing offers to a secure mobile application on a customer device proximate to a media hub, according to an implementation of the invention. The system diagram includes the second customer device(s) 130, the point of sale terminal(s) 135, and the media hub(s) 140. At operation 905b, the second customer device(s) 130 has made a mobile payment for an item in the facility 170. The mobile payment has been transferred to the point of sale terminal(s) 135 and/or the media hub(s) 140. The mobile payment may include, e.g., a payment made using an NFC chip, a payment made using a PayPal® account, a payment made using digital currency, etc. At operation 910b, the point of sale terminal(s) 135 and/or the media hub(s) 140 provide the second customer device(s) 130 with an electronic receipt for the purchase. The electronic receipt may be provided directly to a mobile application on the second customer device(s) 130. Advantageously, the electronic receipt may be free from interception and/or crawling by third-parties, such as third-party email clients and/or third party web browsers.

FIG. 10 is an exemplary depiction of a computer system, according to an implementation of the invention. In the example of FIG. 10, the computer system 1000 can be a computer system that can be used as a client computer system, such as a wireless client or a workstation, or a server computer system. The computer system 1000 includes a computer 1005, I/O devices 1010, and a display device 1015. The computer 1005 includes at least one processor 1020, a communications interface 1025, memory 1030, display controller 1035, non-volatile storage 1040, and I/O controller 1045. The computer 1005 can be coupled to or include the I/O devices 1010 and display device 1015.

The computer 1005 interfaces to external systems through the communications interface 1025, which can include a modem or network interface. It will be appreciated that the communications interface 1025 can be considered to be part of the computer system 1000 or a part of the computer 1005. The communications interface 1025 can be an analog modem, Integrated Services Digital Network (ISDN) modem, cable modem, token ring interface, satellite transmission interface (e.g. "direct Personal Computer (PC)"), or other interfaces for coupling a computer system to other computer systems.

The at least one processor 1020 can be, for example, a conventional microprocessor such as an Intel Pentium microprocessor or Motorola power PC microprocessor. The memory 1030 is coupled to the at least one processor 1020 by a bus 1050. The memory 1030 can be Dynamic Random Access Memory (DRAM) and can also include Static RAM (SRAM). The bus 1050 couples the at least one processor 1020 to the memory 1030, also to the non-volatile storage 1040, to the display controller 1035, and to the I/O controller 1045.

The I/O devices 1010 can include a keyboard, disk drives, printers, a scanner, and other input and output devices, including a mouse or other pointing device. The display controller 1035 can control in the conventional manner a display on the display device 1015, which can be, for example, a cathode ray tube (CRT) or liquid crystal display (LCD). The display controller 1035 and the I/O controller 1045 can be implemented with conventional well known technology.

The non-volatile storage 1040 is often a magnetic hard disk, an optical disk, or another form of storage for large amounts of data. Some of this data is often written, by a direct memory access process, into memory 1030 during execution of software in the computer 1005. One of skill in the art will immediately recognize that the terms "machine-readable medium" or "computer-readable medium" includes any type of storage device that is accessible by the at least one processor 1020 and also encompasses a carrier wave that encodes a data signal.

The computer system 1000 is one example of many possible computer systems which have different architectures. For example, personal computers based on an Intel microprocessor often have multiple buses, one of which can be an I/O bus for the peripherals and one that directly connects the at least one processor 1020 and the memory 1030 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 1030 for execution by the at least one processor 1020. A Web TV system, which is known in the art, is also considered to be a computer system, but it can lack some of the features shown in FIG. 10, such as certain input or output devices. A typical computer system will usually include at least at least one processor, memory, and a bus coupling the memory to the at least one processor.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described herein relate to apparatus for performing the operations. The apparatus can be specially constructed or programmed for the required purposes, or it can comprise a computer selectively activated or reconfigured by a computer program stored in the computer. Such a computer program can be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

For purposes of explanation, numerous specific details are set forth in order to provide a thorough understanding of the description. It will be apparent, however, to one skilled in the art that implementations of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

Other implementations, uses and advantages of the invention will be apparent to those skilled in the art from consideration of the specification and practice of the invention disclosed herein. The specification should be considered exemplary only.

What is claimed is:

1. A system of self-configuring networked media hub devices with automated configuration of peers, wherein a given media hub device is configured to provide media to a user based at least in part on configuration data used to automatically configure the given media hub device, the system comprising:

a media hub device comprising one or more physical processors programmed by one or more computer program instructions to:
identify one or more peer media hub devices on a network;
compare an identity of each of the one or more peer media hub devices with a list of previously known peer media hub devices on the network;
determine that at least a first peer media hub device, from among the one or more peer media hub devices identified on the network, is not on the list of previously known peer media hub devices based on the comparison; and
transmit, via the network from the media hub device, at least a first portion of first configuration data to the first peer media hub device, wherein at least another one of the one or more peer media hub devices, that is different from the media hub device and the first peer media hub device, is programmed to transmit a second portion of the first configuration data to the first peer media hub device, and wherein the at least first peer media hub device configures itself based on the at least first portion of the first configuration data provided by the media hub device and based on the second portion of the first configuration data.

2. The system of claim 1, wherein the media hub device is further programmed to:
determine that at least a second media hub device, from among previously known peer media hub devices, is missing from the one or more peer media hub devices identified on the network based on the comparison; and
determine that the second media hub device should be replaced with the first peer media hub device, wherein the at least first portion of the first configuration data relates to and was used to configure the second media hub device, and wherein the first peer media hub device, when configured with the at least first portion of the first configuration data, operates to replace the second media hub device.

3. The system of claim 2, wherein to determine that the second media hub device should be replaced with the first peer media hub device, the media hub device is further programmed to:
determine a duration of time since the second media hub device was detected; and
determine that the duration of time exceeds a threshold period of time.

4. The system of claim 1, wherein the media hub device is programmed to transmit all of the first configuration data to the first peer media hub device.

5. The system of claim 1, wherein the media hub device is programmed to transmit only the at least first portion of the first configuration data to the first peer media hub device.

6. The system of claim 1, wherein the media hub device is further programmed to:
determine that at least a second media hub device, from among previously known peer media hub devices, is missing from the one or more peer media hub devices identified on the network based on the comparison; and
provide an alert, to a remote system, indicating that the second media hub device has not been detected.

7. The system of claim 1, wherein to identify the one or more peer media hub devices on the network, the media hub device is further programmed to:
transmit, via the network, a peer identification request; and receive, via the network, a response to the peer identification request from each of the one or more peer media hubs that includes at least an identification of a respective peer media hub device.

8. The system of claim 1, wherein the media hub device is further programmed to:
upon initial setup of the media hub device, receive, from a remote system, configuration data for the media hub device, wherein the configuration data for the media hub device comprises at least a location of the media hub device within a location at which the media hub device is deployed;
store, in a local configuration data datastore, the configuration data for the media hub device; and
configure the media hub device based on the configuration data for the media hub device.

9. The system of claim 8, wherein the media hub device is further programmed to:
receive, from the remote system, an identification of at least one peer media hub device, from among the one or more peer media hub devices, with which the media hub device should communicate and second configuration data for the for the at least one peer media hub device; and
store, in the local configuration data datastore, the second configuration data for the at least one peer media hub device.

10. The system of claim 1, wherein the media hub device is further programmed to:
obtain, from a remote system, a plurality of media to be distributed to users via the media hub device;
detect a presence of a user device within a proximity of the media hub device; identify targeted media, from among the plurality of media, to provide the user device; and
transmit the targeted media to the user device.

11. The system of claim 1, wherein the media hub device is embedded with or includes a point of sale printer.

12. A computer-implemented method of self-configuring networked media hub devices with automated configuration of peers, wherein a given media hub device is configured to provide media to a user based at least in part on configuration data used to automatically configure the given media hub device, the method being implemented by a media hub device comprising one or more physical processors programmed by one or more computer program instructions to perform the method, the method comprising:
identifying, by the media hub device, one or more peer media hub devices on a network;
comparing, by the media hub device, an identity of each of the one or more peer media hub devices with a list of previously known peer media hub devices on the network;
determining, by the media hub device, that at least a first peer media hub device, from among the one or more peer media hub devices identified on the network, is not on the list of previously known peer media hub devices based on the comparison; and
transmitting, by the media hub device, via the network, at least a first portion of first configuration data to the first peer media hub device, wherein at least another one of the one or more peer media hub devices, that is different from the media hub device and the first peer media hub device, is programmed to transmit a second portion of the first configuration data to the first peer media hub device, and wherein the at least first peer media hub device configures itself based on the at least first portion of the first configuration data provided by the media hub device and based on the second portion of the first configuration data.

13. The method of claim 12, further comprising:
determining, by the media hub device, that at least a second media hub device, from among previously known peer media hub devices, is missing from the one or more peer media hub devices identified on the network based on the comparison; and
determining, by the media hub device, that the second media hub device should be replaced with the first peer media hub device, wherein the at least first portion of the first configuration data relates to and was used to configure the second media hub device, and wherein the first peer media hub device, when configured with the at least first portion of the first configuration data, operates to replace the second media hub device.

14. The method of claim 13, wherein determining that the second media hub device should be replaced with the first peer media hub device, comprises:
determining, by the media hub device, a duration of time since the second media hub device was detected; and
determining, by the media hub device, that the duration of time exceeds a threshold period of time.

15. The method of claim 12, wherein transmitting the at least first portion of the first configuration data to the first peer media hub device comprises transmitting all of the first configuration data to the first peer media hub device.

16. The method of claim 12, wherein transmitting the at least first portion of the first configuration data to the first peer media hub device comprises transmitting only the at least first portion of the first configuration data to the first peer media hub device.

17. The method of claim 12, further comprising:
determining, by the media hub device, that at least a second media hub device, from among previously known peer media hub devices, is missing from the one or more peer media hub devices identified on the network based on the comparison; and
providing, by the media hub device, an alert, to a remote system, indicating that the second media hub device has not been detected.

18. The method of claim 12, wherein identifying the one or more peer media hub devices on the network comprises:
transmitting, by the media hub device, via the network, a peer identification request; and
receiving, by the media hub device, via the network, a response to the peer identification request from each of the one or more peer media hubs that includes at least an identification of a respective peer media hub device.

19. The method of claim 12, further comprising:
upon initial setup of the media hub device, receiving, by the media hub device, from a remote system, configuration data for the media hub device, wherein the configuration data for the media hub device comprises at least a location of the media hub device within a location at which the media hub device is deployed;
storing, by the media hub device, in a local configuration data datastore, the configuration data for the media hub device; and
configuring, by the media hub device, the media hub device based on the configuration data for the media hub device.

20. The method of claim 19, further comprising:
receiving, by the media hub device, from the remote system, an identification of at least one peer media hub device, from among the one or more peer media hub devices, with which the media hub device should communicate and second configuration data for the for the at least one peer media hub device; and storing, by the media hub device, in the local configuration data datastore, the second configuration data for the at least one peer media hub device.

21. The method of claim 12, further comprising:

obtaining, by the media hub device, from a remote system, a plurality of media to be distributed to users via the media hub device;

detecting, by the media hub device, a presence of a user device within a proximity of the media hub device;

identifying, by the media hub device, targeted media, from among the plurality of media, to provide the user device; and transmitting, by the media hub device, the targeted media to the user device.

* * * * *